(12) United States Patent
Touyamasaki et al.

(10) Patent No.: US 8,826,162 B2
(45) Date of Patent: Sep. 2, 2014

(54) DISPLAY INPUT DEVICE CAPABLE OF INVOKING WORKFLOW, IMAGE FORMING APPARATUS INCLUDING THE SAME, AND DISPLAY METHOD FOR DISPLAY INPUT DEVICE CAPABLE OF INVOKING WORKFLOW

(75) Inventors: Kenta Touyamasaki, Osaka (JP); Mai Gouda, Osaka (JP)

(73) Assignee: Kyocera Document Solutions Inc., Osaka (JP)

( * ) Notice: Subject to any disclaimer, the term of this patent is extended or adjusted under 35 U.S.C. 154(b) by 321 days.

(21) Appl. No.: 13/196,088

(22) Filed: Aug. 2, 2011

(65) Prior Publication Data

US 2012/0033255 A1   Feb. 9, 2012

(30) Foreign Application Priority Data

Aug. 5, 2010   (JP) .................................. 2010-176831

(51) Int. Cl.
*G06F 3/00*   (2006.01)

(52) U.S. Cl.
USPC ......................................... 715/764; 358/1.15

(58) Field of Classification Search
None
See application file for complete search history.

(56) References Cited

U.S. PATENT DOCUMENTS

| | | | | |
|---|---|---|---|---|
| 6,791,707 | B2 * | 9/2004 | Laverty et al. ............... | 358/1.15 |
| 7,698,389 | B2 * | 4/2010 | Sesek et al. ................... | 709/220 |
| 8,305,592 | B2 * | 11/2012 | Park ............................. | 358/1.13 |
| 2004/0036915 | A1 * | 2/2004 | Vleurinck et al. .......... | 358/1.18 |
| 2006/0028690 | A1 | 2/2006 | Kunori | |
| 2007/0133045 | A1 * | 6/2007 | Kubota ........................ | 358/1.15 |

FOREIGN PATENT DOCUMENTS

CN   101207684 A   6/2008

* cited by examiner

*Primary Examiner* — Matt Kim
*Assistant Examiner* — Mahelet Shiberou
(74) *Attorney, Agent, or Firm* — Smith, Gambrell & Russell, LLP.

(57) ABSTRACT

Provided is a display input device including: an input portion for receiving: a designation input for designating a setting screen to be displayed by a program; a job execution start input for starting a job; and a re-invocation input for re-invoking the same program as the executed program; and a control portion for causing, when the program is re-invoked by means of the re-invocation input and the job execution start input, a display portion to display a setting screen that is subsequent, in display order of the program, to the setting screen for which the designation input has been made.

19 Claims, 16 Drawing Sheets

PLEASE SELECT SHEET
SHEET SELECTION
- Auto — K10
- Letter Plain Paper
- Letter Plain Paper
- Letter Plain Paper Cancel | OK
K15    K14

PLEASE MAKE SETTINGS ON AGGREGATE PRINT
AGGREGATE PRINT
- Normal — K11
- 2 in 1 — K12
- 4 in 1 — K13

Layout
- Upper Left →Right
- Upper Right →Left
- Upper Left →Down
- Upper Right →Down

- Without Border
- With Border

Cancel | OK
K15    K14

PLEASE MAKE SETTING ON DUPLEX/DIVISION PRINT
DUPLEX/DIVISION PRINT
- One-Sided →One-Sided
- Double-Page →One-Sided
- Double-Page →Double-Sided
- One-Sided →Double-Sided
- Double-Sided →Double-Sided
- Double-Page →One-Sided Cancel | OK
K15    K14

11,12
94(9)

DISPLAY INPUT DEVICE CAPABLE OF INVOKING WORKFLOW, IMAGE FORMING APPARATUS INCLUDING THE SAME, AND DISPLAY METHOD FOR DISPLAY INPUT DEVICE CAPABLE OF INVOKING WORKFLOW

This application is based upon and claims the benefit of priority from the corresponding Japanese Patent Application No. 2010-176831 filed on Aug. 5, 2010, the entire contents of which are incorporated herein by reference.

BACKGROUND OF THE INVENTION

1. Field of the Invention

The present invention relates to a display input device including a display portion and an input portion such as a touch panel. The present invention also relates to an image forming apparatus including the display input device, such as a copier, a multifunction peripheral, a printer, or a fax machine.

2. Description of Related Art

In recent years, image forming apparatuses come installed with a large number of functions. Accordingly, operation procedures for making settings of printing and the like tend to become complicated. To address this, for example, some image forming apparatuses allow setting items or setting values selected through previously-performed setting operation to be registered as an operation history. Then, when the operation history is invoked, for example, a multifunction peripheral enters into a state in which a predetermined setting item is already selected. This may simplify the procedure for the setting. For example, there is known an image forming apparatus that stores an already-performed operation procedure.

For example, there is known an image forming apparatus including: recording means for recording, as history information, a series of an operation flow (operation procedure) performed by a user; invocation means for invoking the operation flow from the history information; execution means for executing the invoked operation flow; suspension means for temporarily suspending the execution of the operation flow by the execution means; changing means for changing the operation flow suspended by the suspension means; and resumption means for causing the execution means to resume the execution of the operation flow changed by the changing means. With this configuration, it is aimed to reduce time and effort required of a user in setting by enabling, when the recorded user operation is invoked and reproduced, a change to be made to that operation.

As described above, in some cases, the operation history is registered so as to simplify setting input that is performed on the image forming apparatus. However, even if the operation history is registered for later invocation, printing or the like is not always performed using the same settings. When the user desires to change a setting value with respect to the operation history, the user needs to separately perform an input of correcting the setting value after invoking the operation history. In addition, in some cases, it is difficult to recognize what setting item is selected in the invoked operation history and what setting value is set for the setting item.

To address this, in some cases, instead of using the operation history, for example, a plurality of setting items such as frequently-used setting items are selected in advance, and a combination of those setting items is registered as one program. For example, when the program is invoked, setting screens for the setting items selected in advance are sequentially displayed. With this configuration, it is possible to spare time and effort required in selecting a desired setting item from among a multitude of setting items. In addition, the setting value can be set arbitrarily in a series of the flow, thereby resulting in flexible setting.

Then, after invoking the program and completing input with respect to the setting screen that comes last in order, the user gives an instruction to execute a job such as copying. After that, based on the setting contents of the program, the job is actually executed. Incidentally, the user may desire to execute a similar job continuously after the executed job for which the setting has been made by invoking the program. In other words, the user may desire to continuously execute a job that has similar setting contents as those of the job executed based on the program. For example, there is a case where the user desires to execute the next job by changing the setting value of only a certain setting item among the setting items included in the program that was invoked immediately before and executed.

However, conventionally, the program is ended once the job has been executed. Accordingly, the user invokes the same program again. Further, the display order of the setting screens in the program is fixed. Thus, when the user desires to perform the setting for the next job, the user needs to set similar setting contents again by repeating the series of the flow from the first setting screen to the last setting screen with regard to the same program. In other words, the user needs to repeat the series of the flow even when the user desires to continuously execute a job having similar setting contents as the job executed based on the program. Accordingly, the user needs to perform the setting having similar contents again, which makes the setting problematically complicated.

Here, in the publicly-known image forming apparatus described above, the series of the operation flow performed by the user is stored. However, in this image forming apparatus, the operation flow is always reproduced from the beginning. Hence, the above-mentioned image forming apparatus cannot eliminate the complicatedness that occurs at the time of resetting, and thus fails to address the problem that, even when a job having similar setting contents as the job executed immediately before based on the program is executed, the user needs to perform the complicated setting again.

SUMMARY OF THE INVENTION

In view of the above-mentioned problem, the present invention has the following object. That is, when the same program is re-invoked to continuously execute a job having similar setting contents, instead of repeating a series of a flow, a user is allowed to select a setting screen for his/her desired setting item and to cause the setting screen to be displayed, thereby eliminating or alleviating complicatedness of performing setting having similar contents again.

In order to solve the above-mentioned problem, a display input device according to an aspect of the present invention includes: a display portion for displaying a plurality of kinds of executable functions as setting items, and displaying setting screens for the setting items; a storage portion for storing: a program, which is a combination of setting items selected and registered in advance from among a plurality of the setting items, and is invoked to cause the display portion to sequentially display the setting screen for each of the setting items selected and registered in advance; and setting contents of the invoked program; an input portion for receiving at least a selection of the setting item and an input made with respect to the setting screen, and further receiving: a designation input for designating the setting screen to be displayed by the program; a job execution start input for starting a job based on the setting contents of the invoked program; and a re-invocation input for re-invoking, for setting of a next job, the same program as the program for which the job execution start input was made; and a control portion configured to: control displaying of the display portion; recognize the setting contents set by using the input portion; cause, when the program is re-invoked by means of the re-invocation input and the job execution start input, the display portion to start with displaying, and display the setting screens subsequent in display order of the program to, the setting screen for which the designation input has been made; and recognize, as for the setting screen that is not to be displayed, that the same setting as in the program executed immediately before is made.

With this configuration, when the same program is re-invoked to continuously execute a job having similar setting contents, instead of simply repeating the series of the flow, the user is allowed to select a setting screen for his/her desired setting item and to cause the setting screen to be displayed. The user does not need to perform setting with respect to a part for which the same setting as that of the immediately preceding job may be applied. With this configuration, it is possible to eliminate and alleviate the complicatedness that occurs in the setting of the re-invoked program.

Further features and advantages of the present invention will become apparent from the description of embodiments given below.

BRIEF DESCRIPTION OF THE DRAWINGS

FIGS. 6A to 6C are explanatory diagrams each illustrating an example of a setting screen related to copying.

DETAILED DESCRIPTION OF PREFERRED EMBODIMENTS

Hereinbelow, a first embodiment of the present invention is described with reference to FIGS. 1 to 13. Here, the present invention is applicable to various display input devices, but description is given by taking as an example an operation panel 1 (corresponding to a display input device) included in a multifunction peripheral 100 (corresponding to an image forming apparatus). Note that, such elements as configuration and layout described in this embodiment are provided merely by way of example, and not by way of limiting the scope of the invention.

(Outline of Image Forming Apparatus)

Figure 1:
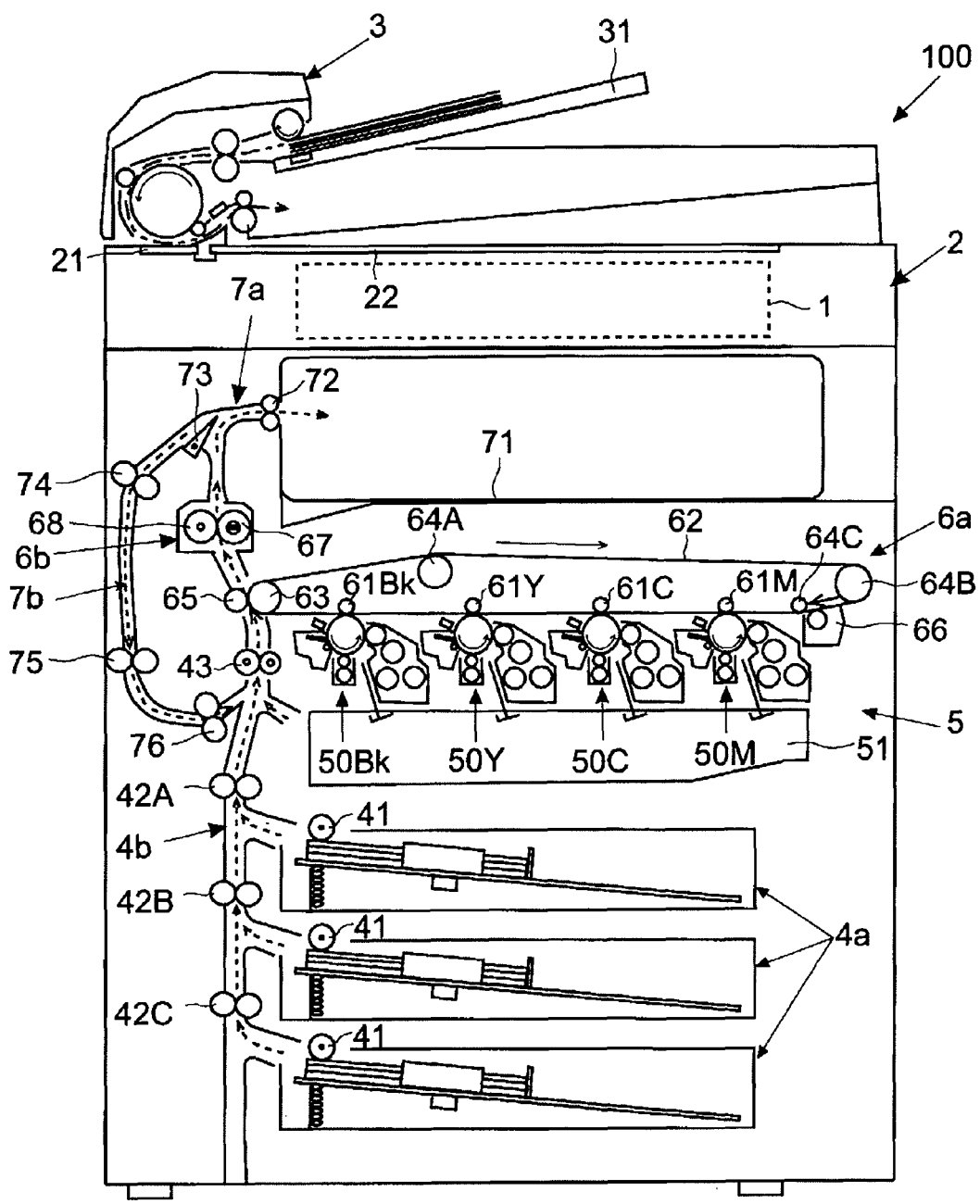
FIG. 1 is a sectional front view schematically illustrating an example of a multifunction peripheral.

First, referring to FIG. 1, an outline of the multifunction peripheral 100 according to the first embodiment of the present invention is described. FIG. 1 is a sectional front view schematically illustrating an example of the multifunction peripheral 100 according to the first embodiment of the present invention.

As illustrated in FIG. 1, the operation panel 1 used for making various settings regarding the multifunction peripheral 100 is provided on a front side of the multifunction peripheral 100 (details thereof are described later). Further, as illustrated in FIG. 1, the multifunction peripheral 100 of this embodiment includes, in an upper portion thereof, an image reading portion 2 and a document conveying device 3, and also includes, in an inside thereof, sheet feeding portions 4a, a conveyance path 4b, an image forming portion 5, an intermediate transfer portion 6a, a fixing portion 6b, a delivery conveyance portion 7a, a duplex conveyance path 7b, and the like.

The document conveying device 3 includes a document tray 31 on which documents to be read are placed. Then, the document conveying device 3 automatically conveys the documents continuously one by one from the document tray 31 to a reading position (contact glass 21 for feed reading). Further, the document conveying device 3 is mounted to the image reading portion 2 so as to be openable/closable in a vertical direction with a depth-direction side of the document conveying device 3 in the drawing sheet of FIG. 1 as a point of support. The document conveying device 3 functions as a cover that presses, from above, contact glasses (the contact glass 21 for feed reading and a contact glass 22 for placement reading) of the image reading portion 2.

Next, as illustrated in FIG. 1, the image reading portion 2 includes, in a top surface thereof, the contact glass 21 for feed reading and the contact glass 22 for placement reading, on which a document is placed when such a document as a book is read one sheet by one sheet. In the image reading portion 2, a lamp, mirrors, lenses, an image sensor, etc. (not shown) are disposed. Based on light reflected from a document passing by the contact glass 21 for feed reading or light reflected from a document placed on the contact glass 22 for placement reading, the image sensor reads the document. Then, the image sensor converts the reflected light to an analog electrical signal in accordance with an image density. Then, the image reading portion 2 performs quantization, thereby obtaining image data on the document. Note that, the image reading portion 2 of this embodiment is capable of both color reading and black-and-white reading.

The plurality of the sheet feeding portions 4a inside a main body of the multifunction peripheral 100 respectively accommodate a plurality of sheets of various sizes (for example, letter size, the A series paper such as A4, the B series paper such as B4, etc.) and of various types (for example, copy paper, recycled paper, cardboard, OHP sheets, etc.). Each of the sheet feeding portions 4a is provided with a sheet feeding roller 41 configured to be driven rotationally, and, at the time of printing, any one of the sheet feeding portions 4a feeds sheets one by one to the conveyance path 4b.

The conveyance path 4b is a path for conveying a sheet from the sheet feeding portion 4a toward the image forming portion 5 inside the apparatus. Further, the conveyance path 4b is provided with guides for guiding sheets. Further, the conveyance path 4b is provided with conveying roller pairs 42 (in FIG. 1, from the top, a total of three 42A, 42B, and 42C) that are rotationally driven when a sheet is conveyed. Further, the conveyance path 4b is provided with a registration roller pair 43 for holding a conveyed sheet in front of the image forming portion 5 and feeding the sheet in synchronization with a timing at which a formed toner image is transferred.

The image forming portion 5 includes a plurality of image forming units 50 (50Bk for black, 50Y for yellow, 50C for cyan, and 50M for magenta) and an exposure device 51. Based on image data obtained through reading by the image reading portion 2, image data stored in a storage device 82 described later, or such other data, the exposure device 51 outputs a laser beam while turning ON/OFF the laser beam, to thereby subject each photosensitive drum included in the image forming unit 50 to scanning exposure. The image forming unit 50 includes the photosensitive drum supported so as to be rotationally driven, and a charging device, a developing device, a cleaning device, and the like which are arranged around the photosensitive drum. Then, by means of each image forming unit 50 and the exposure device 51, a toner image is formed on an outer periphery of the photosensitive drum.

The intermediate transfer portion 6a is subjected to a primary transfer of a toner image from each image forming unit 50, and then secondarily transfers the toner image onto a sheet. The intermediate transfer portion 6a includes primary transfer rollers 61Bk to 61M, an intermediate transfer belt 62, a drive roller 63, a plurality of driven rollers 64 (64A to 64C), a secondary transfer roller 65, a belt cleaning device 66, and the like. The respective primary transfer rollers 61Bk to 61M sandwich the endless intermediate transfer belt 62 with the corresponding photosensitive drums. Each of the primary transfer rollers 61Bk to 61M is applied with transfer voltage, and the toner image is transferred onto the intermediate transfer belt 62.

The intermediate transfer belt 62 is stretched in a tensioned manner by means of the drive roller 63 and the like, and is rotated by the rotational driving of the drive roller 63 connected to a driving mechanism such as a motor (not shown). Further, the drive roller 63 sandwiches the intermediate transfer belt 62 with the secondary transfer roller 65. The toner images (having respective colors of black, yellow, cyan, and magenta) formed by the respective image forming units 50 are sequentially superimposed with no misregistration, and the resultant image is primarily transferred onto the intermediate transfer belt 62. After that, the toner image is transferred onto a sheet by the secondary transfer roller 65 applied with a predetermined voltage.

The fixing portion 6b fixes the toner image that has been transferred onto the sheet. The fixing portion 6b is mainly configured by a heating roller 67 embedded with a heating element and a pressure roller 68 that is brought into pressure contact with the heating roller 67. Then, when the sheet passes through a nip portion formed by the heating roller 67 and the pressure roller 68, the toner is heated/fused. As a result, the toner image is fixed on the sheet. The sheet delivered from the fixing portion 6b is conveyed in a direction toward a delivery tray 71.

The delivery conveyance portion 7a sorts, regarding the sheet conveying direction, the printed sheet in the direction toward the delivery tray 71 or in a direction toward the duplex conveyance path 7b. The delivery conveyance portion 7a is provided with a delivery roller pair 72 that conveys a sheet in the direction toward the delivery tray 71 by being rotationally driven in a normal direction of the rotation, or performs switchback for duplex print by rotating in a reverse direction. Further, the delivery conveyance portion 7a includes a switchover valve 73 for switching the sheet conveying directions. The switchover valve 73 is configured to pivot. The switchover valve 73 is at the basic position when the duplex conveyance path 7b is closed to guide a sheet in the direction toward the delivery tray 71, and at the time of duplex print, the switchover valve 73 pivots to guide, to the duplex conveyance path 7b, a switchbacked sheet whose one side is already printed.

The duplex conveyance path 7b connects a downstream side of the fixing portion 6b and an upstream side of the registration roller pair 43. The duplex conveyance path 7b is provided with a plurality of duplex conveyance roller pairs 74 to 76 (three in total) that are rotationally driven for duplex print, to thereby convey a sheet whose one side is already printed.

(Operation Panel 1)

Figure 2:
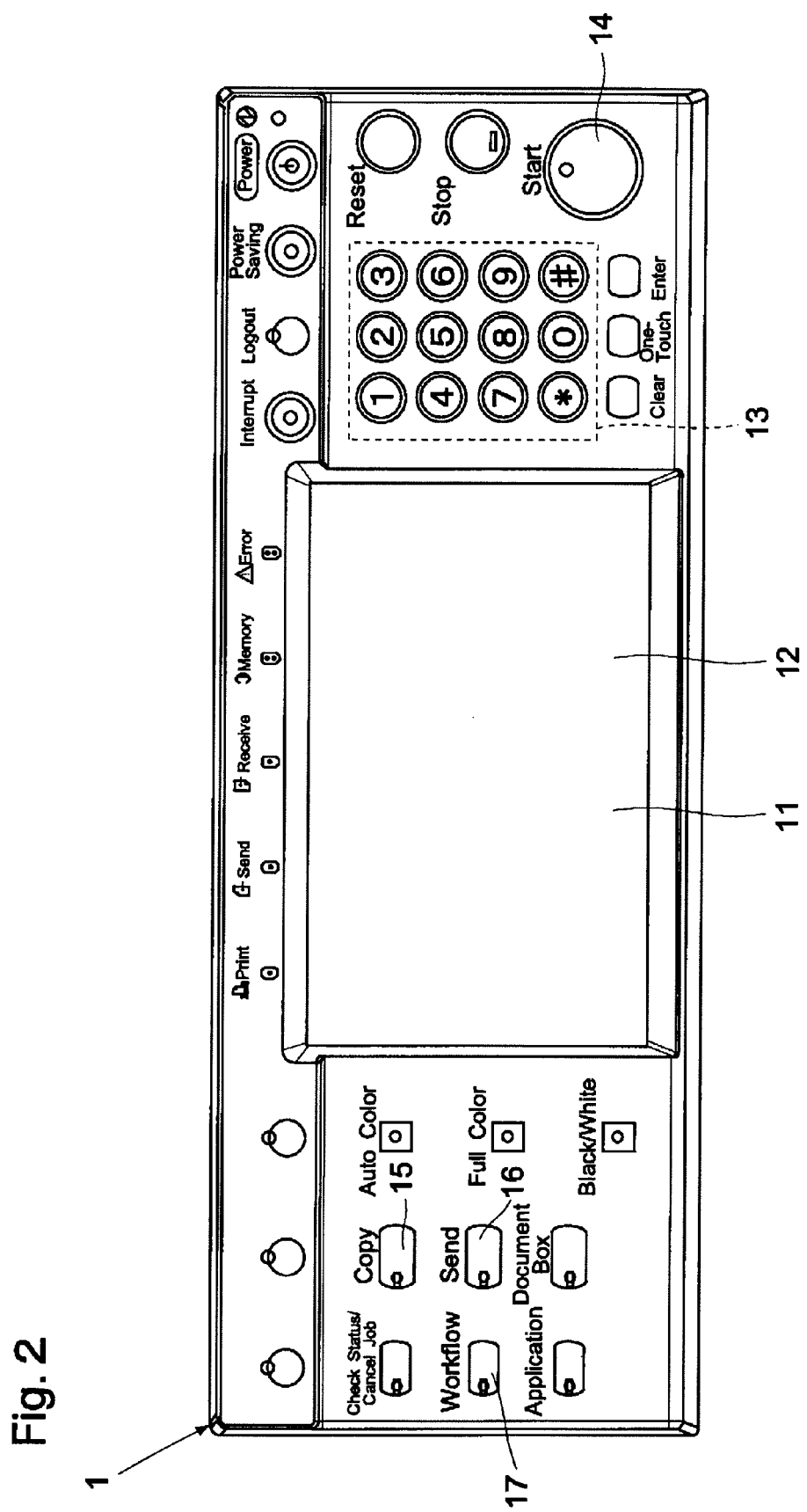
FIG. 2 is a plan view illustrating an example of an operation panel.

Next, referring to FIG. 2, description is given of an example of the operation panel 1 according to the first embodiment of the present invention. FIG. 2 is a plan view illustrating an example of the operation panel 1 according to the first embodiment of the present invention.

As illustrated in FIG. 1, the operation panel 1 is provided in the upper front of the multifunction peripheral 100. The operation panel 1 includes a liquid crystal display portion 11 (corresponding to display portion) for displaying a screen and various images, such as menus and keys used for making settings of the multifunction peripheral 100 and giving operation instructions, and a message regarding the state of the multifunction peripheral 100. A user can press the keys displayed on the liquid crystal display portion 11 to make various settings about copying for the multifunction peripheral 100.

Further, a touch panel portion 12 (corresponding to input portion) is provided on the top surface of the liquid crystal display portion 11. The touch panel portion 12 is used for detecting the position and coordinates of a part pressed by the user on the liquid crystal display portion 11. By comparing the coordinates detected by the touch panel portion 12 to the positions and coordinates of various keys displayed on the liquid crystal display portion 11, the key selected by the user through pressing is identified. Note that, the touch panel portion 12 is not particularly limited, and thus can employ various types, such as a resistive type, a surface acoustic wave type, an infrared type, and a capacitive type.

Further, the operation panel 1 is provided with the following hard keys (buttons). For example, there are provided a numeric keypad portion 13 (corresponding to the input portion) for inputting numerals, a start key 14 (corresponding to the input portion) for giving an instruction to start such processing as copying after various settings are made, and the like. Further, there are provided, for example, a copy key 15 (corresponding to the input portion) to be pressed when a copy function is used and a send key 16 (corresponding to the input portion) to be pressed when a scanner function or a fax function is used. Further, there is also provided a workflow key 17 (corresponding to the input portion) to be pressed when a workflow is created or registered, or a workflow is invoked (details thereof are described later). As described above, the operation panel 1 is provided with the touch panel portion 12 and the various hard keys, and functions as the input portion used for making various settings, selecting modes, and performing other operations with regard to respective functions of the multifunction peripheral 100.

(Hardware Configuration of Multifunction Peripheral 100 and the like)

Figure 3:
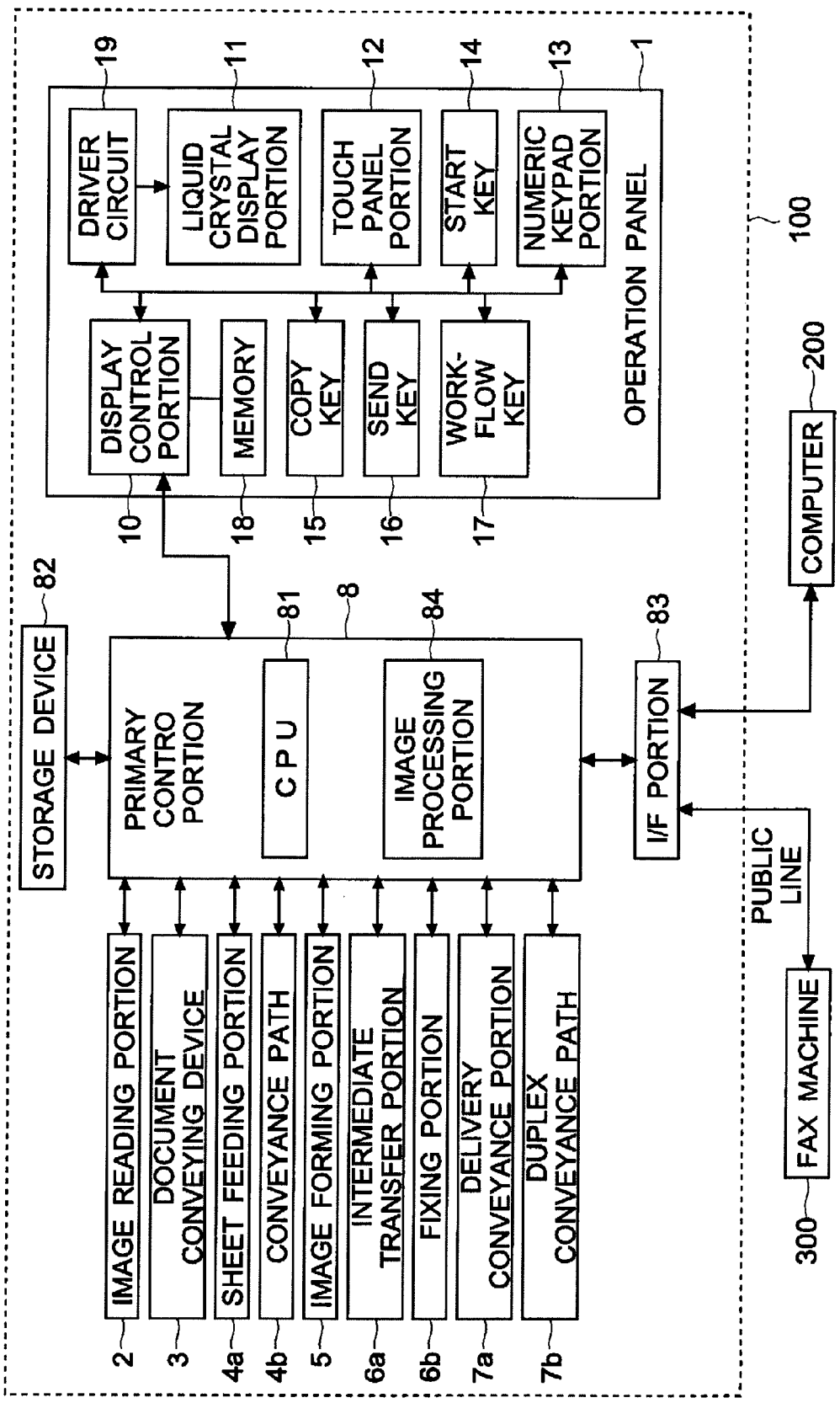
FIG. 3 is a block diagram illustrating an example of a hardware configuration of the multifunction peripheral.
Figure 4:
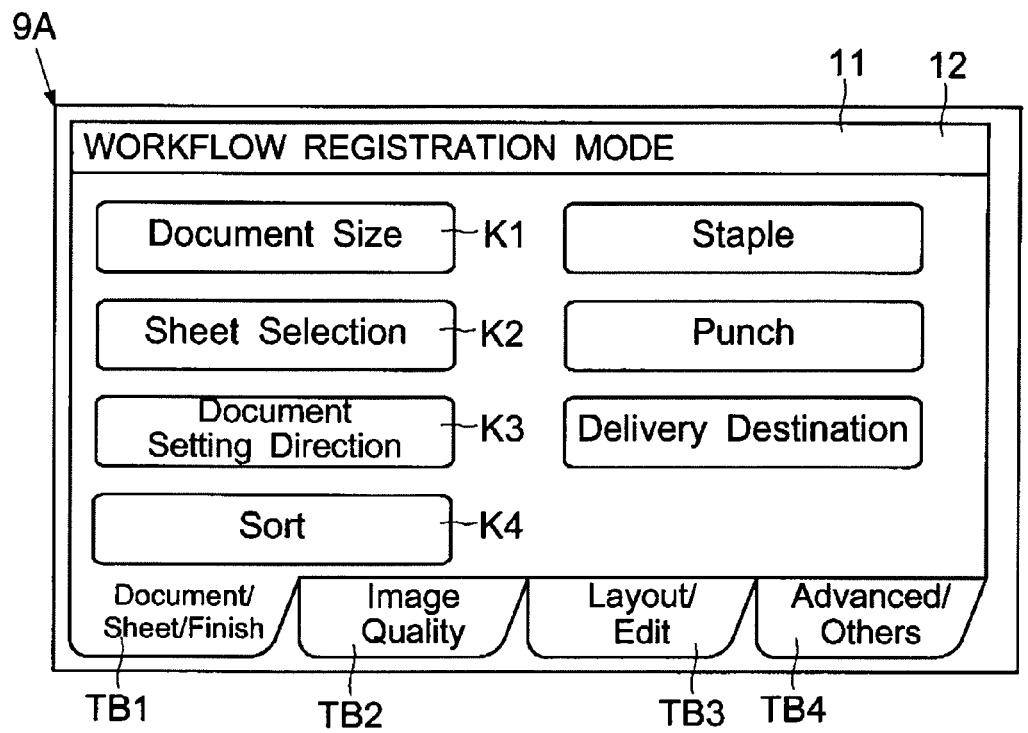
FIGS. 4A and 4B are explanatory diagrams each illustrating an example of a selection screen for setting items which is displayed when a workflow related to copying is created.
Figure 4:
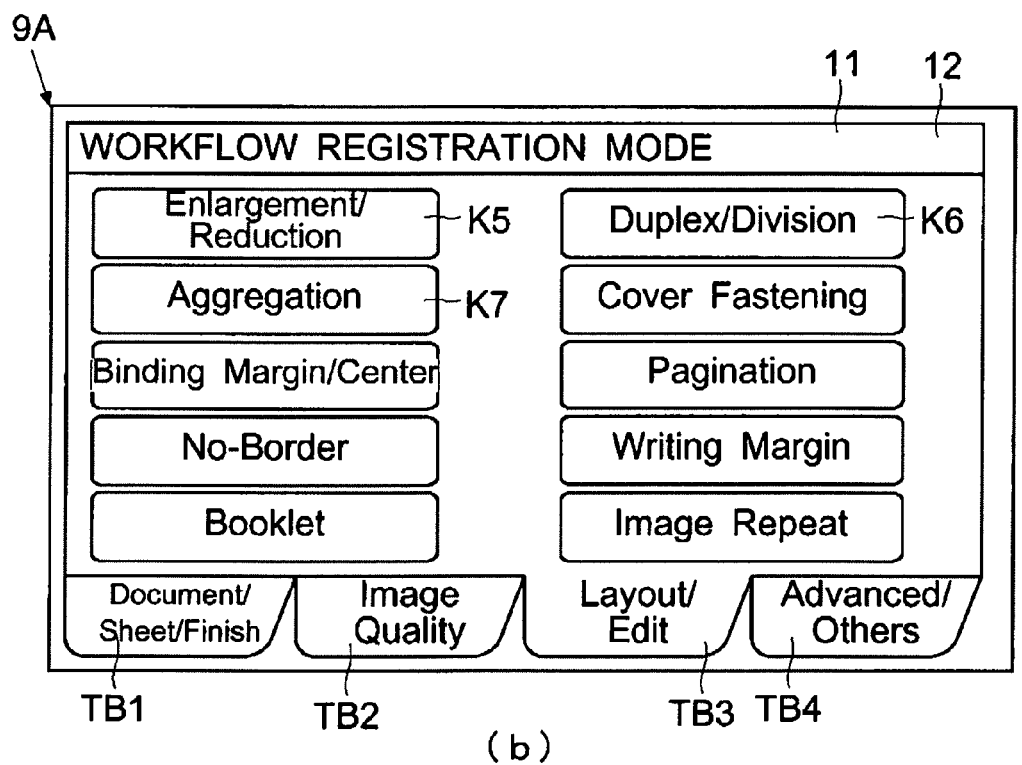

Next, referring to FIG. 3, description is given of an example of a hardware configuration of the multifunction peripheral 100 and the like according to the first embodiment of the present invention. FIG. 3 is a block diagram illustrating an example of the hardware configuration of the multifunction peripheral 100 and the like according to the first embodiment of the present invention.

First, description is given of the main body of the multifunction peripheral 100. A primary control portion 8 is provided inside the main body of the multifunction peripheral 100. For example, the primary control portion 8 is connected to the operation panel 1, the document conveying device 3, the image reading portion 2, the sheet feeding portion 4*a*, the conveyance path 4*b*, the image forming portion 5, the fixing portion 6*b*, the delivery conveyance portion 7*a*, and the like, and controls those components.

The primary control portion 8 includes, for example, a CPU 81 and other elements. The CPU 81 performs computation or the like in accordance with a control program, which is stored in a storage device 82 (corresponding to storage portion) and is to be loaded therefrom, thereby controlling respective portions of the multifunction peripheral 100. Note that, as the primary control portion 8, a plurality of kinds of control portions may be provided depending on the function. For example, such control portions may include a main control portion that performs overall control and image processing, and an engine control portion that controls printing by, for example, performing image formation and turning ON/OFF motors or the like that cause various rotational bodies to rotate. In this specification, description is given by presenting those control portions integrated as the one primary control portion 8.

The storage device 82 is connected to the primary control portion 8. The storage device 82 is configured by combining non-volatile and volatile storage devices such as ROM, a RAM, a HDD, and the like. The storage device 82 can store various pieces of data, including a control program, control data, and setting data of the multifunction peripheral 100, and image data. Note that, the workflow refers to a combination of setting items, which are selected and registered in advance from among a plurality of setting items, and also to a program for causing the display portion (liquid crystal display portion 11) to display a screen for setting the setting items selected and registered in advance by invoking the workflow.

Further, the primary control portion 8 is connected to an interface portion (hereinafter, referred to as I/F portion 83) provided with various connectors, a socket, a fax modem, and the like. The I/F portion 83 is connected to a plurality of external computers 200 (for example, personal computers) and to the communication partner's fax machine 300 (in FIG. 3, only one external computer 200 and one fax machine 300 are illustrated for the sake of convenience) via a network, a public line, or the like. For example, image data obtained by the image reading portion 2 can be stored in the storage device 82, or the image data can be transmitted to the external computer 200 or the communication partner's fax machine 300 from the I/F portion 83 (the scanner function and the fax function). Further, it is also possible to perform printing, fax transmission, and the like based on image data that has been input to the I/F portion 83 through the transmission from the external computer 200 or the communication partner's fax machine 300 (the printer function and the fax function).

Further, for example, the primary control portion 8 includes an image processing portion 84. The image processing portion 84 performs image processing on image data obtained by reading a document by the image reading portion 2 or on image data input to the multifunction peripheral 100 via the I/F portion 83. For example, image data processed by the image processing portion 84 is transmitted to the exposure device 51, which then uses the image data when subjecting the photosensitive drum to scanning/exposure.

Further, the primary control portion 8 recognizes an input made to the operation panel 1, and controls the multifunction peripheral 100 to perform copying or the like in accordance with the settings made by the user. For example, when the duplex print is set on the operation panel 1, the primary control portion 8 controls the delivery conveyance portion 7*a* to cause the switchover valve 73 to pivot, for example.

The operation panel 1 of this embodiment includes a display control portion 10, a memory 18 (corresponding to the memory portion), a driver circuit 19, the liquid crystal display portion 11, and the touch panel portion 12. The display control portion 10 is constituted by, for example, a CPU, an IC, and the like. The display control portion 10 controls displaying of the liquid crystal display portion 11, and receives an output from the touch panel portion 12, to thereby identify the coordinates at which the liquid crystal display portion 11 is pressed. The memory 18 stores data such as a table indicating a correspondence between the output from the touch panel portion 12 and the coordinates. The display control portion 10 compares the coordinates of a pressed position and image data of a corresponding setting screen 9 to each other, to thereby identify and recognize a key selected (pressed) on the setting screen 9.

In a normal operation, in order to select a setting item and set a setting value for each function of the multifunction peripheral 100, selecting a key displayed on the liquid crystal display portion 11 is repeated from a topmost layer of the liquid crystal display portion 11. Then, every time a key is selected, the display control portion 10 causes the liquid crystal display portion 11 to switch its display. Then, eventually, the setting value is set for the function that the user intends to select and set. The display control portion 10 recognizes that this function has been selected and set, and then transmits a content thereof to the primary control portion 8 in the main body. By doing so, the primary control portion 8 causes the respective portions, such as the image forming portion 5, to perform an operation that reflects the function selected and set via the operation panel 1. Thus, the intention of the user is reflected in printing and the like (for example, density setting, enlargement/reduction, etc.).

Further, image data of screens and images to be displayed by the liquid crystal display portion 11 is stored in, for example, the memory 18 of the operation panel 1. Accordingly, every time a key is pressed in a selection screen 9A for the setting item or each setting screen 9, the display control portion 10 reads image data of a screen to be displayed next from the memory 18.

Alternatively, the image data of screens and images to be displayed by the liquid crystal display portion 11 may be stored in, for example, the storage device 82 on the main body side. In this case, the operation panel 1 receives the image data that is to be used for a display by the liquid crystal display portion 11 from the storage device 82 via the primary control portion 8. Upon receiving the image data, the display control portion 10 gives an instruction to the driver circuit 19 that actually controls displaying of the liquid crystal screen. Note that, the display control portion 10 and the memory 18 do not need to be provided to the operation panel 1, and instead, the configuration (the CPU 81 and the storage device 82) of the primary control portion 8 may be used for the functions of the display control portion 10 and the memory 18.

(Creation and Registration of Workflow)

Next, referring to FIGS. 4A, 4B, 5, 6A, 6B, 6C, 7, and 8, description is given of an outline of creation and registration of a workflow performed in the multifunction peripheral 100 according to the first embodiment of the present invention.

First, the multifunction peripheral 100 of this embodiment has a multitude of settable functions and a variety of setting items. The liquid crystal display portion 11 displays the selection screen 9A for selecting, from among the plurality of setting items, a setting item for which settings are to be made, and the user selects (presses) a setting item (function) to be used in printing or transmission. For example, the liquid crystal display portion 11 displays each setting item as a key. Further, the liquid crystal display portion 11 displays the setting screen 9 for the selected setting item. The user can select various kinds of functions and make various kinds of settings by pressing, for example, keys displayed on each setting screen 9 or hard keys arranged around the liquid crystal display portion 11. In other words, the user sets a setting value in a setting item by performing input with respect to the setting screen 9 for each setting item displayed on the liquid crystal display portion 11.

Here, certain setting items are used in combination frequently when the user uses the multifunction peripheral 100. Examples of such a case include a combination of aggregate print and duplex print for the purpose of suppressing sheet consumption, and a combination of a transmission method and a transmission destination of image data obtained through reading by the image reading portion 2. However, as described above, the multifunction peripheral 100 has a variety of setting items (functions), and thus it is bothersome and inconvenient to perform the same setting every time the multifunction peripheral 100 is used.

To address this, in the multifunction peripheral 100 of this embodiment, a frequently-used combination of setting items can be selected and created in advance, and the combination of the setting items can be stored as a workflow (corresponding to a program) (details thereof are described later). Then, when the user invokes the workflow (program containing data indicating setting items selected in advance, display order, and display format) stored in the storage device 82, screens for setting the setting items selected in advance are displayed on the liquid crystal display portion 11.

Next, specific description is given of an example of creating and registering a workflow by using the operation panel 1. For example, when the workflow key 17 is pressed, the display control portion 10 causes the liquid crystal display portion 11 to display an invocation screen 9D (see FIG. 9) for invoking a workflow. When a registration/edit key K22 is pressed on the invocation screen 9D, the display control portion 10 recognizes start of registration of a new workflow, and receives an input for creating and registering a workflow via the touch panel portion 12 or the like. The display control portion 10 receives and recognizes an input specifying a setting item to be included in a workflow that is to be created.

[Selection of Setting Item]

Figure 5:
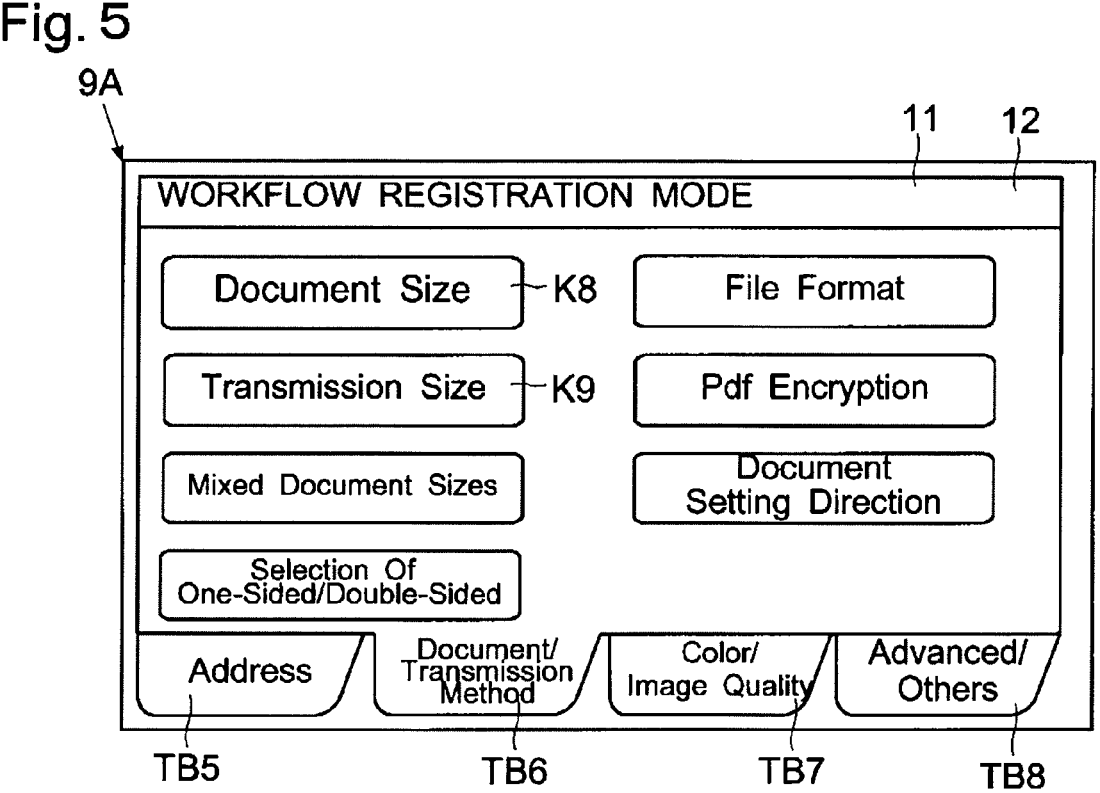
FIG. 5 is an explanatory diagram illustrating an example of a selection screen for setting items which is displayed when a workflow related to transmission is created.

Here, referring to FIGS. 4A, 4B, and 5, description is given of an example of selecting a setting item to be included in a workflow. FIGS. 4A and 4B are explanatory diagrams each illustrating an example of the selection screen 9A for setting items which is displayed when a workflow related to copying is created. FIG. 5 is an explanatory diagram illustrating an example of the selection screen 9A for setting items which is displayed when a workflow related to transmission is created.

First, referring to FIGS. 4A and 4B, description is given of selection of a setting item performed when a workflow related to copying is created. For example, in the case of creating a workflow, when the copy key 15 is pressed, the display control portion 10 causes the liquid crystal display portion 11 to display the selection screen 9A for setting items related to the copy function as illustrated in FIGS. 4A and 4B. The liquid crystal display portion 11 displays a plurality of tabs, such as a document/sheet/finish tab TB1, an image quality tab TB2, a layout/edit tab TB3, and an advanced/others tab TB4, in the selection screen 9A. Note that, more kinds of tabs may be provided.

For example, when the document/sheet/finish tab TB1 is pressed, as illustrated in FIG. 4A, the display control portion 10 causes the liquid crystal display portion 11 to display setting items related to the document, the sheet, and the finish. The setting items are arranged as keys. For example, when the document/sheet/finish tab TB1 is pressed, there are arranged: a document size key K1 for setting the size of a document to be read; a sheet selection key K2 for setting a sheet to be used for printing; a document setting direction key K3 for setting the setting direction of a document on the contact glass 22 for placement reading or the document conveying device 3; a sort key K4 for setting the print order etc. of each sheet when a plurality of sheets are printed; and other keys (although the keys for other setting items are also assigned functions, description thereof is herein omitted).

Further, for example, when the layout/edit tab TB3 is pressed, as illustrated in FIG. 4B, the display control portion 10 causes the liquid crystal display portion 11 to display setting items related to the layout and editing of a page or an image at the time of copying. In this selection screen 9A, too, the respective setting items are arranged as keys. For example, when the layout/edit tab TB3 is pressed, there are arranged: an enlargement/reduction key K5 for setting the scaling of an image, such as enlargement and reduction; a duplex/division key K6 for setting duplex print or division print in which each page of a duplex-printed document or a double-page printed document is printed in a divided manner; an aggregation key K7 for making settings regarding such copying that a plurality of pages of a document are printed in one page; and other keys (although the keys for other setting items are also assigned functions, description thereof is herein omitted).

Further, when the image quality tab TB2 is pressed, the liquid crystal display portion 11 displays keys corresponding to setting items related to image quality (for example, density setting). Further, when the advanced/others tab TB4 is pressed, the liquid crystal display portion 11 displays advanced setting items related to copying (for example, mirror image print and printing with black and white reversed) as keys.

Next, referring to FIG. 5, description is given of selection of a setting item performed when a workflow related to transmission is created. As illustrated in FIG. 5, in the case of creating a workflow, when the send key 16 is pressed, the display control portion 10 causes the liquid crystal display portion 11 to display the selection screen 9A (see FIG. 5) for setting items related to the function of transmitting image data obtained by reading a document, such as FAX or scan.

For example, as illustrated in FIG. 5, the liquid crystal display portion 11 displays a plurality of tabs, such as an address tab TB5, a document/transmission method tab TB6, a color/image quality tab TB7, and an advanced/others tab TB8, in the selection screen 9A for transmission. Note that, more kinds of tabs may be provided.

For example, as for the transmission, too, respective setting items are arranged as keys. As illustrated in FIG. 5, when the document/transmission method tab TB6 is pressed, setting items related to a document to be read and the transmission method for image data are displayed. Then, in the liquid crystal display portion 11, there are arranged: a document size key K8 for setting the size of a document to be read; a transmission size key K9 for setting the size of image data to be transmitted; and other keys (although the keys for other setting items are also assigned functions, description thereof is herein omitted).

After a setting item is set on such a selection screen 9A, the display control portion 10 causes the liquid crystal display portion 11 to display the setting screen 9 prepared for setting a setting value in the selected setting item. Then, the display control portion 10 recognizes the setting value (key indicating the pressed setting value) set by the user on the setting screen 9 as a default setting value for the workflow.

[Setting of Setting Value]

Here, referring to FIGS. 6A to 6C, description is given of an example of setting a setting value for a setting item to be included in a workflow. FIGS. 6A to 6C are explanatory diagrams each illustrating an example of the setting screen 9 related to copying.

For example, FIG. 6A illustrates a setting screen 91 for a setting item of sheet selection, FIG. 6B illustrates a setting screen 93 for a setting item of aggregate print, and FIG. 6C illustrates a setting screen 94 for a setting item of duplex/division print. In this manner, for each setting item, a setting screen 9 is prepared (as for other setting items, illustrations thereof are herein omitted).

For example, FIG. 6A is an example of the setting screen 91 displayed when the sheet selection key K2 is pressed (when the setting item of sheet selection is selected). In the setting screen 91 for sheet selection, the liquid crystal display portion 11 displays an automatic sheet selection key K10 and keys indicating the types of sheets in the sheet feeding portions 4a. Further, FIG. 6B is an example of the setting screen 93 displayed when the aggregation key K7 is pressed (when the setting item of aggregate print is selected). In the setting screen 93 for aggregate print, the liquid crystal display portion 11 displays, for example, a normal setting key K11 (one page is included in one page), a 2-in-1 key K12 (two pages are aggregated into one page), and a 4-in-1 key K13 (four pages are aggregated into one page) so that the number of pages to be included in one page is set. Further, the liquid crystal display portion 11 also displays keys and the like for setting the page layout and boundaries at the time of aggregation. Further, FIG. 6C is an example of the setting screen 94 displayed when the duplex/division key K6 is pressed (when the setting item of duplex/division print is selected). In the setting screen 94 for duplex/division print, the liquid crystal display portion 11 displays a plurality of keys for setting a mode of duplex print or division print.

The display control portion 10 causes a key pressed on each setting screen 9 to be displayed in a black-and-white reversed manner. Further, the display control portion 10 causes each setting screen 9 to display, for example, an OK key K14 and a cancel key K15. When the OK key K14 is pressed, the selected (pressed) setting value is set as a default setting value for the workflow (for example, in FIG. 6C, a mode of (one-sided document→duplex print) is set as the default setting value: duplex print is performed based on one-side printed documents).

In this manner, the user selects a setting item to be included in the workflow and sets a default setting value as needed. Then, the display control portion 10 checks whether or not an input that gives an instruction to end the selection of a setting item to be included in the workflow has been received. For example, a plurality of kinds of inputs may be used to give an instruction to end the selection of a setting item to be included in the workflow. For example, such inputs may be determined arbitrarily, including the depression of the start key 14, the depression of the workflow key 17, and the like. Further, every time the OK key K14 is pressed, there may be displayed a confirmation screen for asking the user whether or not to end the selection of a setting item.

Figure 7:
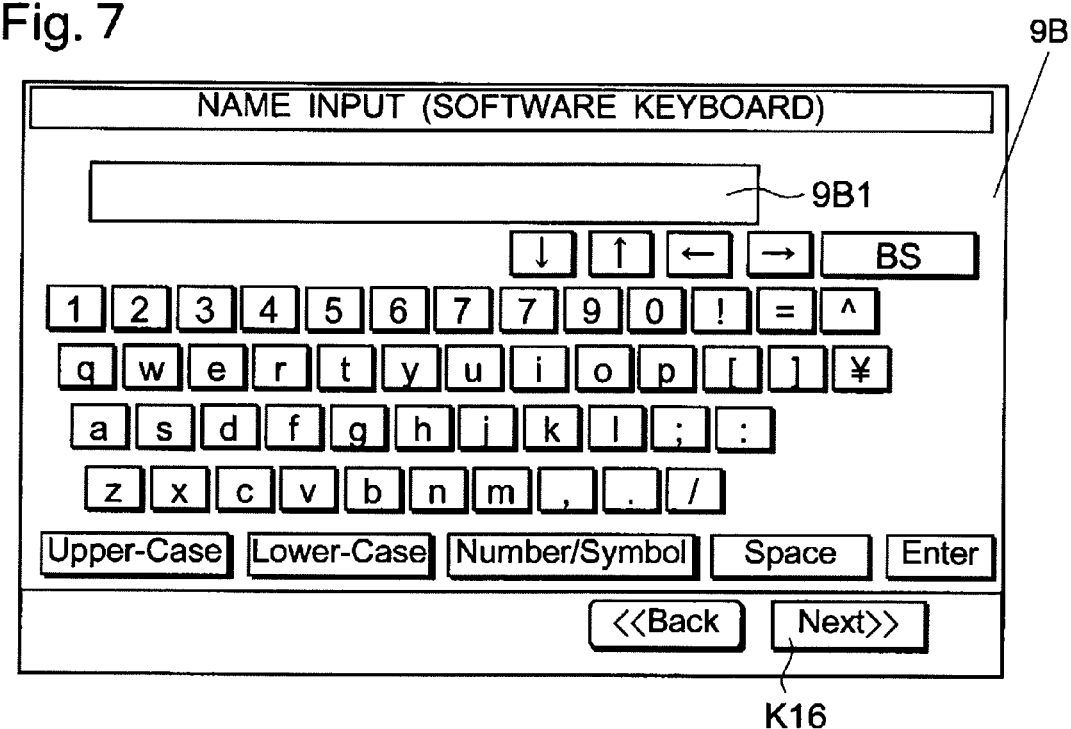
FIG. 7 is an explanatory diagram illustrating an example of a name input screen for a workflow.

After the selection of a setting item to be included in the workflow is ended, the display control portion 10 causes a name input screen 9B for the workflow to be displayed as illustrated in FIG. 7. FIG. 7 is an explanatory diagram illustrating an example of the name input screen 9B for the created workflow.

For example, the user performs input on a software keyboard in the name input screen 9B, thereby inputting a name of the workflow with the alphabet, numerals, or the like. The display control portion 10 changes displaying of a name display field 9B1 according to the input performed by the user on the software keyboard. Then, for example, the display control portion 10 recognizes, as the name of the workflow currently being created, a content shown in the name display field 9B1 when a "next" key K16 is pressed.

Figure 8:
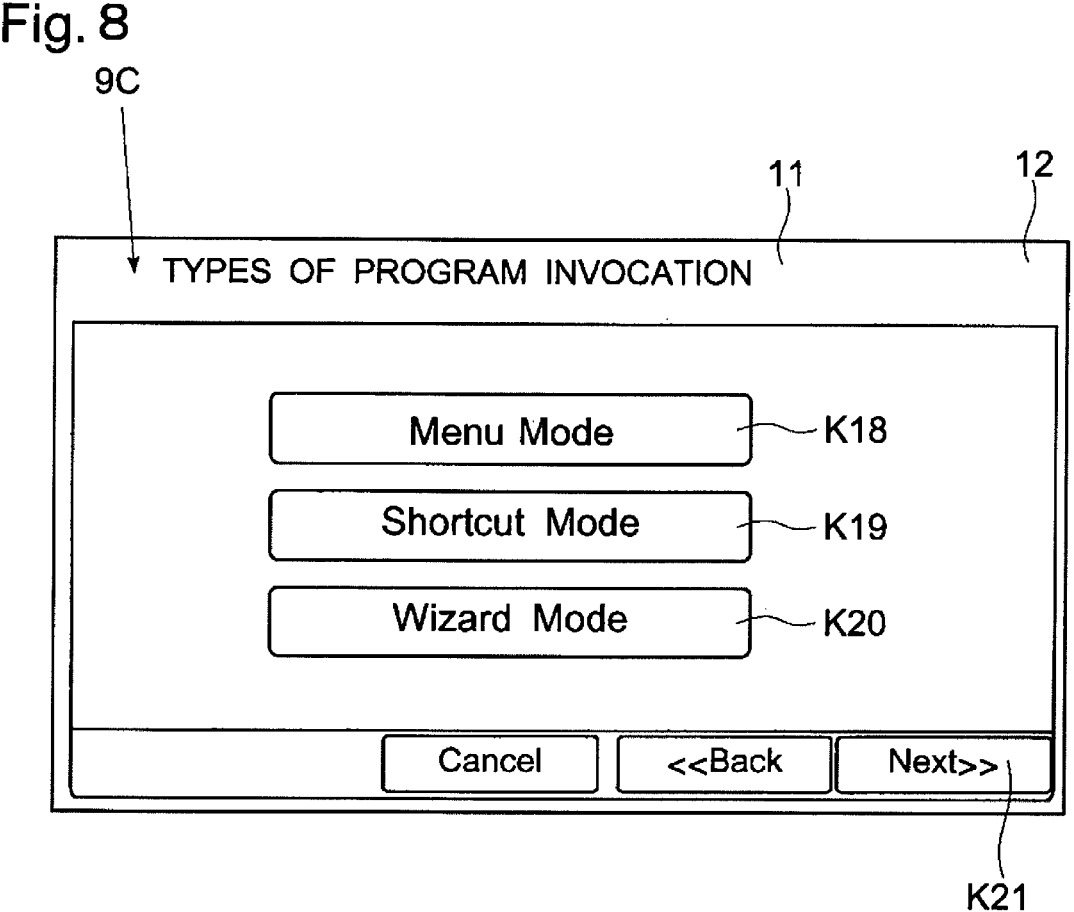
FIG. 8 is an explanatory diagram illustrating an example of a display format determination screen for determining a display format that is to be used when a workflow is invoked.

Moreover, subsequently to the name input screen 9B, the display control portion 10 causes a display format determination screen 9C to be displayed for determining a display format that is to be used when the created workflow is invoked, and the user selects the display format of the workflow. For example, the display control portion 10 causes the display format determination screen 9C illustrated in FIG. 8 to be displayed. FIG. 8 is an explanatory diagram illustrating an example of the display format determination screen 9C for determining the display format that is to be used when the workflow is invoked.

For example, the user presses, on the display format determination screen 9C, any one of a menu mode key K18 (menu format), a shortcut mode key K19 (list display format), and a wizard mode key K20 (wizard format). The display control portion 10 recognizes, as the display format of the workflow currently being created, the display format corresponding to the key selected when a "next" key K21 is pressed.

Then, when the "next" key K21 is pressed, the storage device 82 or the memory 18 stores the created workflow. In other words, the display control portion 10 or the primary control portion 8 causes the storage device 82 or the memory 18 to store the name of the workflow, the display format, setting items to be included, the display order of the setting items (corresponding to the order in which the setting items are selected at the time of creating the workflow), and the default setting values in the setting items. After that, the operation panel 1 recovers from the workflow registration mode to the normal input mode.

(Invocation and use of Workflow)

Figure 9:
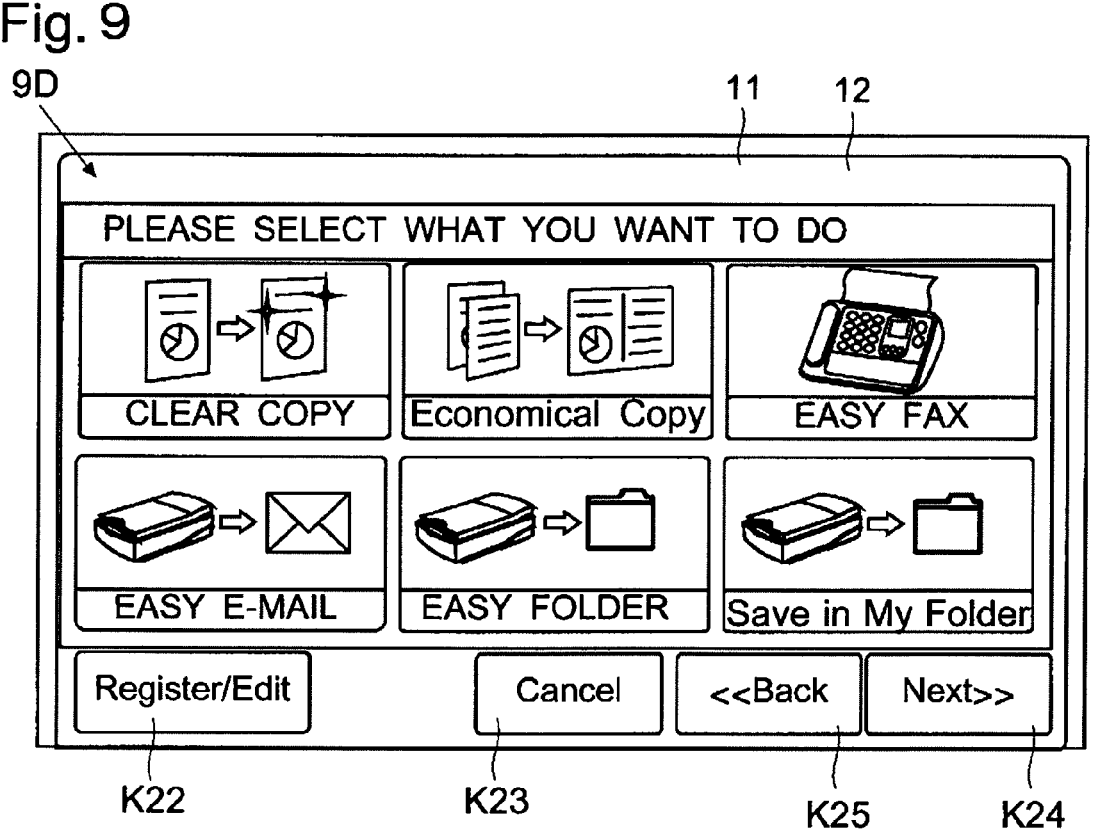
FIG. 9 is an explanatory diagram illustrating an example of an invocation screen displayed at the time of selecting a workflow.
Figure 10:
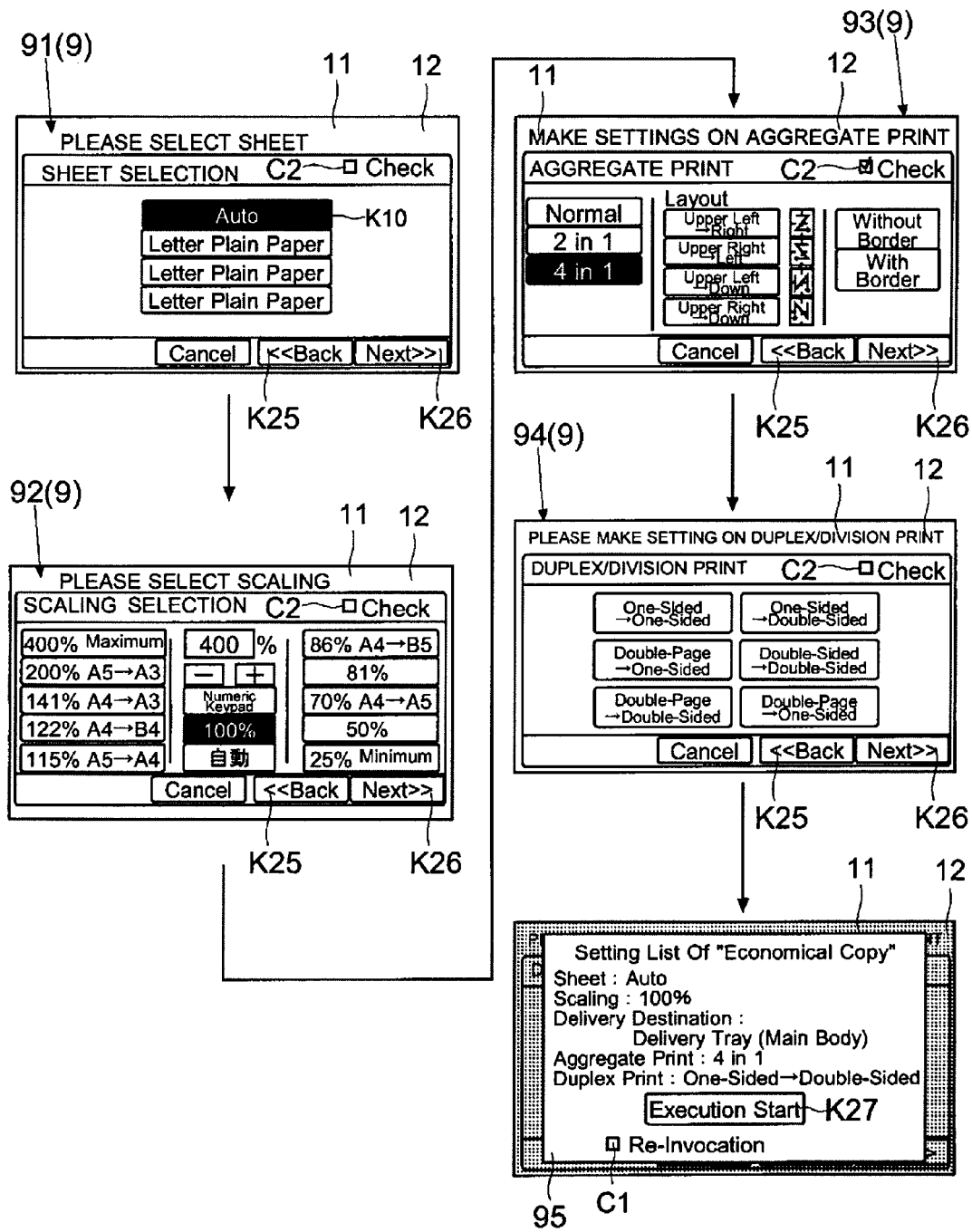
FIG. 10 is an explanatory diagram illustrating an example of a flow used when a workflow is displayed in a wizard format.
Figure 11:
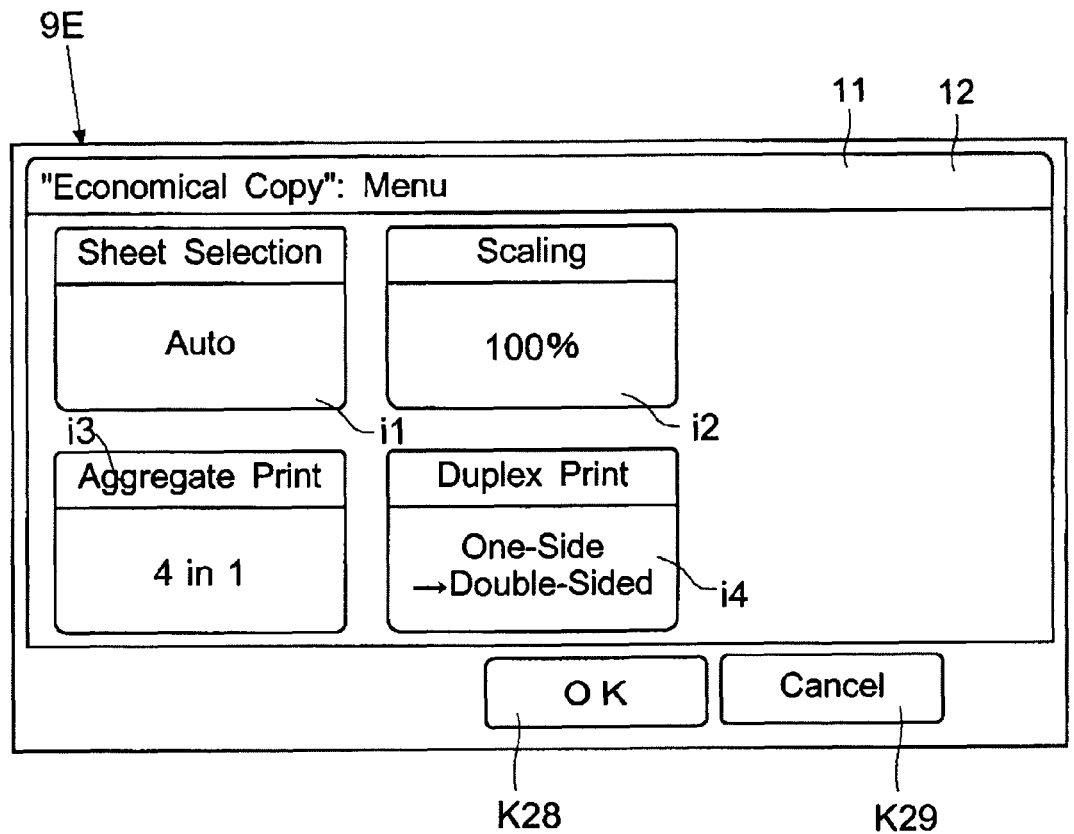
FIG. 11 is an explanatory diagram illustrating an example of a menu screen displayed when a workflow is displayed in a menu format.

Next, referring to FIGS. 9 to 11, description is given of an outline of the workflow and an example of invoking and using the workflow according to the first embodiment of the present invention. FIG. 9 is an explanatory diagram illustrating an example of the invocation screen 9D displayed at the time of selecting the workflow according to the first embodiment of the present invention. FIG. 10 is an explanatory diagram illustrating an example of a flow used when the workflow is displayed in the wizard format. FIG. 11 is an explanatory diagram illustrating an example of a menu screen 9E displayed when the workflow is displayed in the menu format.

For example, when the user desires to invoke a workflow registered in advance, the user presses the workflow key 17 (see FIG. 2). Then, as illustrated in FIG. 9, the invocation screen 9D for selecting a workflow to be used (invoked) from among the workflows registered in advance is displayed on the liquid crystal display portion 11. For example, in FIG. 9, there are displayed workflows named "clear copy", "economical copy", "easy FAX", "easy e-mail", "easy folder", and "save in my folder". When the image indicating each workflow is pressed, the pressed workflow is invoked from the storage device 82 or the memory 18. Then, the liquid crystal display portion 11 displays screens for making settings according to the workflow.

Note that, in a lower portion of the invocation screen 9D, there is arranged the registration/edit key K22, which is pressed when a workflow is newly created or when an already-registered workflow is edited. In addition, there is arranged a cancel key K23 for stopping invocation of a workflow. Further, as illustrated in FIG. 9, a limited number of workflows are displayed in one screen. Thus, when a "next" key K24 is pressed, the invocation screen 9D is switched to a next page, thereby displaying an image showing workflows different from those of FIG. 9. Further, when a "back" key K25 is pressed, the invocation screen 9D is switched to a previous page.

Next, description is given of displaying and setting performed when a workflow is invoked. Note that, when a workflow is invoked, as the display format of a screen for setting, the wizard format, the menu format, and the list display format are prepared. Which display format is used for display can be set at the time of registering a workflow as described above. Now, for each of the display formats, description is given of a case where a workflow is invoked.

[Wizard Format]

First, referring to FIG. 10, the wizard format for a workflow is described. For example, FIG. 10 illustrates an example of a workflow displayed in the wizard format when the workflow of "economical copy" of FIG. 9 is invoked.

The workflow of "economical copy", which is described as an example, is created and registered so as to include the setting items of "sheet selection", "scaling", "aggregate print", and "duplex/division print". Further, the workflow is created and registered so that the setting screens 9 for the respective setting items are displayed in order from the setting screen 91 of "sheet selection" to a setting screen 92 of "scaling" to the setting screen 93 of "aggregate print" to the setting screen 94 of "duplex/division print". Note that, the black arrows in FIG. 10 indicate the display order. Note that, each setting screen 9 displayed when a workflow is invoked is the same as that displayed at the time of registration of a workflow or at the time of normal setting.

In each setting screen 9, the "back" key K25 and a "next" key K26 are arranged. When the "back" key K25 is pressed, the liquid crystal display portion 11 displays the setting screen 9 for the previous setting item. On the other hand, when the "next" key K26 is pressed, the liquid crystal display portion 11 displays the setting screen 9 for the next setting item. The user presses a key for setting arranged in each setting screen 9, to thereby set a setting value for each setting item. For example, as illustrated in FIG. 10, the pressed key for setting is displayed in a black-and-white reversed manner (white characters are displayed against black background).

Note that, in a case where a default setting value is already set for a setting item at the time of creating and registering a workflow, the default value is stored as part of the workflow in the storage device 82 or the memory 18. For example, in a case where the workflow has been created with "4-in-1" as the default value, when the displaying is switched from the setting screen 92 of "scaling" to the setting screen 93 of "aggregate print" for the first time, as illustrated in FIG. 10, the liquid crystal display portion 11 displays the 4-in-1 key K13 as already being selected.

Then, when the "next" key K26 is pressed on the setting screen 94 of "duplex/division print" after the setting of all the four setting items registered in advance as the workflow are completed, the liquid crystal display portion 11 displays a setting confirmation list 95. In the setting confirmation list 95, the setting items included in the workflow and the setting values of the respective setting items are displayed. In addition, in the setting confirmation list 95, an execution start key K27 and a re-invocation box C1, which is a kind of a checkbox, are displayed. Then, when the execution start key K27 is pressed in a state in which the re-invocation box C1 is not marked, the primary control portion 8 recognizes the contents displayed in the setting confirmation list 95, and controls the multifunction peripheral 100 based on the recognized contents, thereby executing a job. Note that, a case where the re-invocation box C1 is marked is described later.

[Menu Format]

Next, referring to FIG. 11, the menu format for a workflow is described. For example, FIG. 11 illustrates an example of the menu screen 9E in the menu format displayed when the workflow of "economical copy" of FIG. 9 is invoked.

As illustrated in FIG. 11, in the menu format, for example, when the workflow of "economical copy" is invoked, there are displayed a menu image i1 of "sheet selection", a menu image i2 of "scaling", a menu image i3 of "aggregate print", and a menu image i4 of "duplex/division print". Accordingly, depending on the selected workflow, different menu images are displayed on the menu screen 9E. Then, in each of the menu images, the default setting value is also displayed. As described above, in the menu format, the setting items included in the workflow are displayed as a menu.

The user presses the menu image of the setting item of which he/she desires to change the setting value. With this, the displaying of the liquid crystal display portion 11 switches to the setting screen 9 for each setting item as illustrated in, for example, FIG. 10. Then, when the setting on the setting screen 9 is completed, the displaying of the liquid crystal display portion 11 is switched back to the menu screen 9E illustrated in FIG. 11.

Further, on the menu screen 9E, an OK key K28 and a cancel key K29 are arranged. When the OK key K28 is pressed, the liquid crystal display portion 11 displays the setting confirmation list 95 illustrated in FIG. 10. Details of the setting confirmation list 95 may be the same as in the case described with reference to FIG. 10, and hence description thereof is herein omitted. On the other hand, when the cancel key K29 is pressed, the settings using the workflow are canceled.

[List Display Format]

Next, referring to FIG. 10, the list display format for a workflow is described. In the list display format, when a workflow to be used is selected on the invocation screen 9D of FIG. 9, the setting confirmation list 95 illustrated in FIG. 10 is displayed on the liquid crystal display portion 11 first. Details of the setting confirmation list 95 may be the same as in the case of the wizard format described with reference to FIG. 10, and hence description thereof is herein omitted.

As described above, when a program is invoked, the display portion (liquid crystal display portion 11) of the display input device (operation panel 1) performs displaying in any one of the display formats: the wizard format in which the respective setting items included in the program are sequentially displayed in an interactive manner; the list display format in which the respective setting items included in the program are displayed in a list in an aligned manner; and the menu format in which the images showing the respective setting items included in the program are displayed (within a single screen).

(Re-Invocation in Wizard Format)

Figure 12:
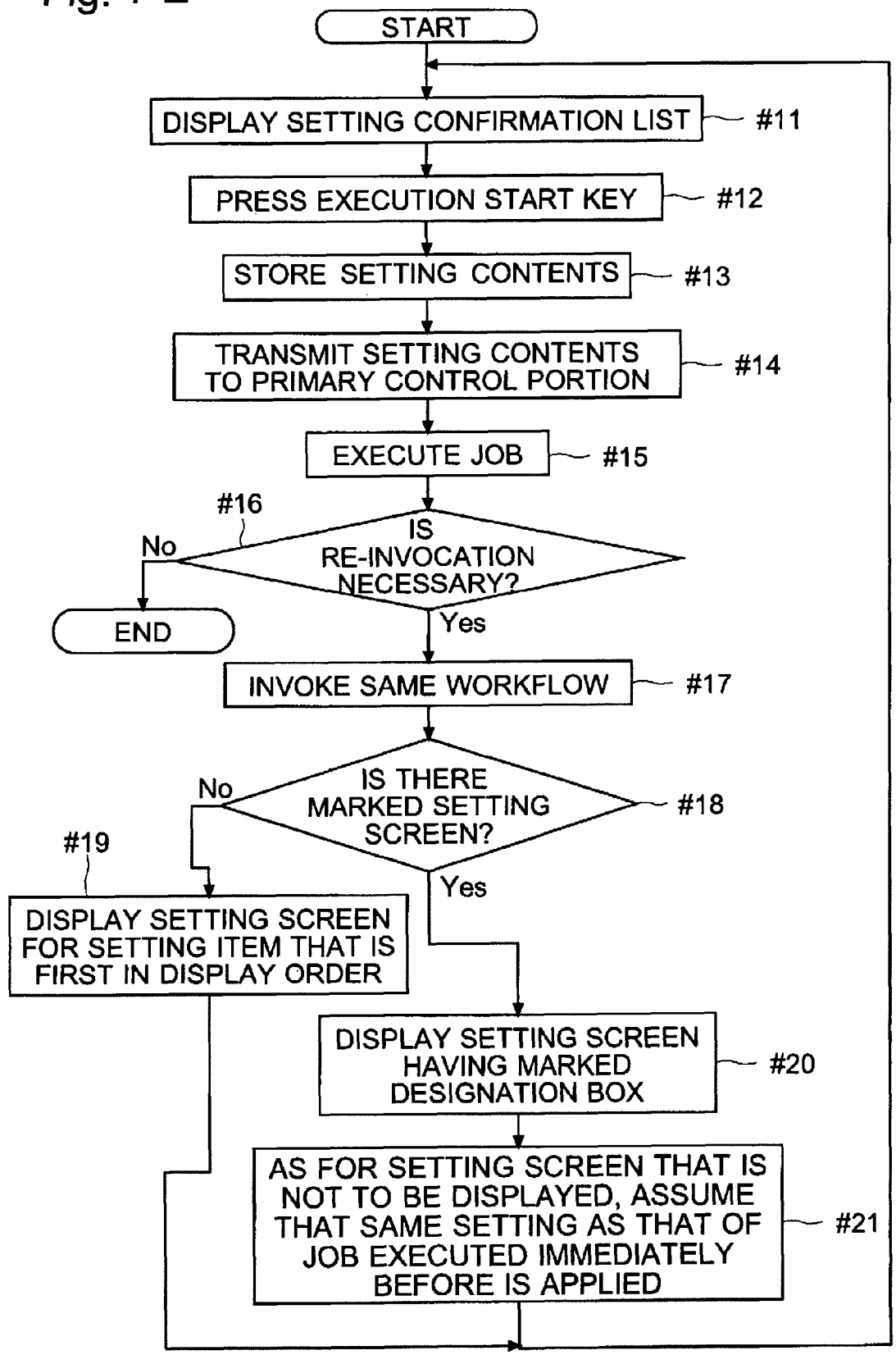
FIG. 12 is a flow chart illustrating an example of display control performed when re-invocation of a workflow is performed in the wizard format in the multifunction peripheral.
Figure 13:
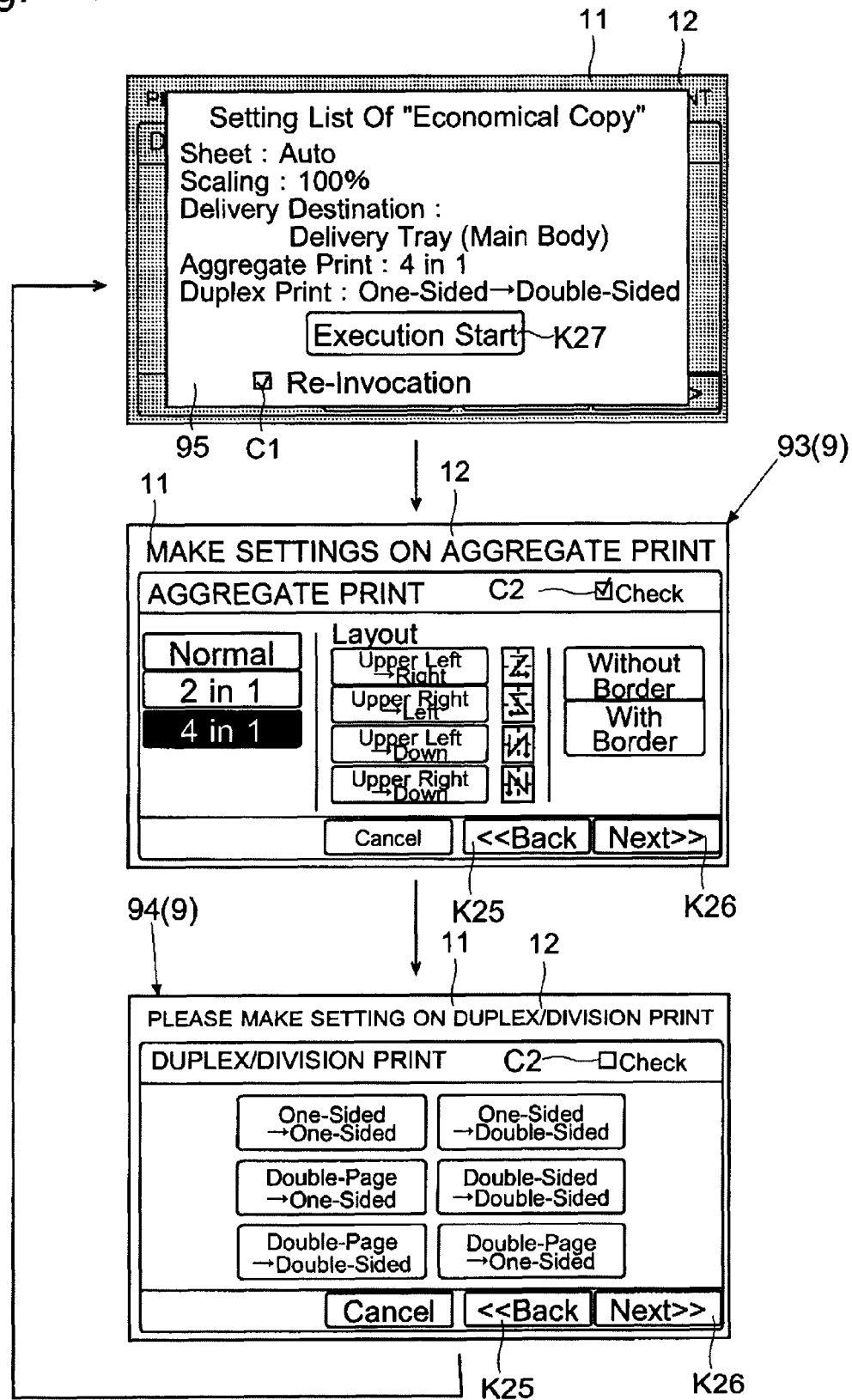
FIG. 13 is an explanatory diagram illustrating an example of display order used when the re-invocation of a workflow is performed in the wizard format in the multifunction peripheral.

Next, referring to FIGS. 10, 12, and 13, description is given of an example of display control regarding re-invocation of a workflow in the wizard format. FIG. 12 is a flow chart illustrating an example of the display control performed when a workflow is re-invoked in the wizard format in the multifunction peripheral 100 according to the first embodiment of the present invention. FIG. 13 is an explanatory diagram illustrating an example of the display order used when a workflow is re-invoked in the wizard format in the multifunction peripheral 100 according to the first embodiment of the present invention.

In the multifunction peripheral 100 of this embodiment, various settings can be made regarding copying and transmission by using a workflow. However, after all the settings are completed and the job is executed along the workflow, in some cases, the user may desire to execute a job having similar setting contents. In this case, if the same workflow is automatically re-invoked on the occasion of the execution of the job, this is convenient. In addition, if the setting is omitted for a part whose setting may be the same as that of the job executed immediately before, it becomes possible to avoid repeating similar setting with respect to the re-invoked workflow. Therefore, the inconvenience felt by the user is eliminated, with the result that the usability of the operation panel 1 is improved.

Therefore, in order to designate the setting screen 9 that is to be displayed when the same workflow is re-invoked after setting the workflow and executing the job, the liquid crystal display portion 11 displays a designation box C2, which is a checkbox, on each setting screen 9 for the setting item included in the workflow. The designation box C2 is for designating whether or not to display the setting screen 9 in the re-invoked workflow (corresponding to designation input). Further, the setting confirmation list 95 is also provided with the re-invocation box C1, and when the re-invocation box C 1 is marked (corresponding to re-invocation input), and the execution start key K27 is pressed (corresponding to job execution start input), the display control portion 10 transmits the setting contents of the workflow to the primary control portion 8. With this, such a job as copying or transmission is started. In addition, the display control portion 10 invokes the same workflow as the workflow with which the job was executed, and causes the setting screen 9 having the marked designation box C2 to be displayed. In other words, when the execution start key K27 is pressed in the state in which the re-invocation box C1 is marked, the display control portion 10 determines that an input for re-invoking the same workflow as the executed workflow has been made for a next job.

For example, the user marks the designation box C2 of the setting screen 9 for the setting item that he/she desires to check in the re-invoked workflow. When the designation box C2 is pressed, the display control portion 10 causes the liquid crystal display portion 11 to display a checkmark in the designation box C2. For example, FIG. 10 illustrates a state in which the designation box C2 of the setting screen 93 of "aggregate print" is marked. Further, when the user desires that the marked setting item be displayed first in the re-invoked workflow, the user marks the re-invocation box C1, and then presses the execution start key K27. Then, the display control portion 10 takes a shortcut to cause the setting screen 93 of "aggregate print" having the marked designation box C2 to be displayed without displaying the setting screens 91, 92 in the re-invoked workflow.

Next, referring to FIG. 12, description is given of a flow of the above-mentioned display control performed when a workflow is re-invoked. First, at the start of FIG. 12, all the settings have already been made for the workflow.

Next, the display control portion 10 displays the setting confirmation list 95 showing the respective setting values of the setting items included in the workflow (Step #11). Subsequently, the display control portion 10 recognizes the depression of the execution start key K27 on the liquid crystal display portion 11 based on an output from the touch panel portion 12 (reception of operation input) (Step #12). Note that, if necessary, the user presses the re-invocation box C1 between Step #11 and Step #12.

Then, the display control portion 10 causes the memory 18 (which may be replaced with the storage device 82) to store the setting contents of the workflow for which the execution start key K27 has been pressed (Step #13). The setting contents refer to keys (setting values) pressed on the setting screens 9 for the respective setting items.

Further, the display control portion 10 transmits the setting contents determined in the workflow to the primary control portion 8 (Step #14). Then, the primary control portion 8 causes a job such as copying adapted to the setting contents to be executed (Step #15).

Subsequently, the display control portion 10 checks whether or not the re-invocation box C1 is marked, that is, whether or not the re-invocation of the workflow is necessary (Step #16). When the re-invocation box C1 is not marked, which means that there is no need to re-invoke the workflow (No in Step #16), this control may be ended (end).

On the other hand, when the re-invocation box C1 is marked, and thus the workflow is re-invoked (Yes in Step #16), the display control portion 10 invokes the same workflow (program) as the workflow with which a job was executed immediately before (Step #17).

Next, the display control portion 10 checks whether or not there is any setting screen 9 having the marked designation box C2 (Step #18). When there is no setting screen 9 having the marked designation box C2 (No in Step #18), the display control portion 10 causes the liquid crystal display portion 11 to display the setting screen 9 for the setting item that is first in the display order among the setting items included in the workflow (Step #19). In this case, the setting is performed from the setting screen for the setting item set at the beginning of the workflow, and a series of steps of the flow is repeated.

On the other hand, when there is a setting screen 9 having the marked designation box C2 (Yes in Step #18), the display control portion 10 causes the liquid crystal display portion 11 to display the setting screen 9 having the marked designation box C2 (Step #20). Note that, when a plurality of setting screens 9 have the marked designation box C2 in the workflow, the display control portion 10 causes the liquid crystal display portion 11 to display the setting screen 9 positioned first in the display order among those setting screens 9. Further, as for the settings of the setting screens that are not to be displayed, the display control portion 10 regards those settings as being the same as those of the job executed immediately before, based on the storage contents of the memory 18 (Step #21).

In this embodiment, when a re-invocation input has been made, the display portion (liquid crystal display portion 11) starts with displaying, and displays all setting screens 9 subsequent in the display order to, the setting screen 9 for which a designation input has been made. Then, after Step #19 or Step #21, according to the settings for the workflow, the "next" key K26 is pressed once or a plurality of times, and, as a result, the setting confirmation list 95 is displayed (returning to Step #11).

For example, referring to FIG. 13, description is given of the re-invocation of a program performed in the case where the workflow of "economical copy" of FIG. 9 is invoked, and the designation box C2 of the setting screen 93 for the setting item of aggregate print is marked. When an input for performing the re-invocation (the depression of the re-invocation box C1) has been made, as illustrated in FIG. 13, after the setting confirmation list 95 is displayed, a job is started, and, at the same time, the display control portion 10 causes the liquid crystal display portion 11 to display the setting screen 93 for aggregate print as a new workflow. Then, when the "next" key K26 is pressed, the display control portion 10 causes the liquid crystal display portion 11 to display the setting screen 94 for duplex/division print. Further, when the "next" key K26 is pressed, the display control portion 10 causes the liquid crystal display portion 11 to display the setting confirmation list 95.

When the input for performing the re-invocation has been made to execute the job, the display control portion 10 prevents the setting screen 9 for the setting item that precedes the designated setting item from being displayed in the re-invoked workflow. Then, as for the setting screen 9 for the setting item which is not to be displayed, it is assumed that the same setting as that of the previously-executed workflow has been made (the setting content is stored in, for example, the memory 18). storing: a program, which is a combination of setting items selected and registered in advance As described above, a display input device (for example, operation panel 1) according to the present invention includes: a display portion (liquid crystal display portion 11) for displaying a plurality of kinds of executable functions as setting items, and displaying setting screens 9 for the setting items; a storage portion (memory 18, storage device 82) for storing: a program, which is a combination of setting items selected and registered in advance from among a plurality of the setting items, and is invoked to cause the display portion to sequentially display the setting screen 9 for each of the setting items selected and registered in advance; and setting contents of the invoked program; an input portion (touch panel portion 12 or the like) for receiving at least a selection of the setting item and an input made with respect to the setting screen 9, and further receiving: a designation input (the depression of the designation box C2, marking) for designating the setting screen to be displayed by the program; a job execution start input (for example, the depression of the execution start key K27) for starting a job based on the setting contents of the invoked program; and a re-invocation input (the depression of the re-invocation box C1, marking) for re-invoking, for setting of a next job, the same program as the program for which the job execution start input was made; and a control portion (display control portion 10) configured to: control displaying of the display portion; recognize the setting contents set by using the input portion; cause, when the program is re-invoked by means of the re-invocation input and the job execution start input, the display portion to start with displaying, and display the setting screens 9 subsequent in display order of the program to, the setting screen 9 for which the designation input has been made; and recognize, as for the setting screen 9 that is not to be displayed, that the same setting as in the program executed immediately before is made.

The user makes the designation input in advance with respect to the setting screen 9 that is likely to become necessary. With this, when the program is re-invoked, the setting screen 9 that precedes, in the display order, the setting screen 9 for which the designation input has been made is not displayed. Moreover, as for the setting item that is not to be displayed, it is assumed that the same setting as that of the immediately preceding job (program) has been made. With this configuration, when the program is re-invoked, the setting item for which the same setting as that of the immediately preceding job may be applied is skipped, thereby taking a shortcut to the setting screen 9 for which the designation input has been made. Accordingly, even when the same program is re-invoked to continuously perform the job having similar setting contents, not the entire series of steps of the flow is repeated, and it is possible to skip to the intended setting screen 9, with the result that there is no need to make a setting for a part for which the same setting as that of the immediately preceding job may be applied. With this configuration, it is possible to eliminate or alleviate the complicatedness of the setting. In addition, the usability of the display input device (for example, operation panel 1) is improved.

Further, when the program is re-invoked, the control portion (display control portion 10) causes the display portion (liquid crystal display portion 11) to start with displaying, and display all the setting screens 9 that are subsequent in the display order to, the setting screen 9 for which the designation input (the depression of the designation box C2, marking) has been made (corresponding to Step #20 of FIG. 12). With this configuration, it is possible to redo or check the setting from the setting screen 9 for which the designation input has been made among the setting screens 9 included in the program. Therefore, even when the same program is re-invoked, not the entire series of steps of the flow is repeated, and hence it is possible to eliminate or alleviate the complicatedness of the setting.

Further, when the program is re-invoked by means of the re-invocation input and the job execution start input in the state in which there is no setting screen 9 for which the designation input (the depression of the designation box C2, marking) has been made, the control portion (display control portion 10) causes the display portion (liquid crystal display portion 11) to display the setting screen 9 from the setting item that is first in the display order among the setting items included in the workflow (corresponding to Step #19 of FIG. 12). With this configuration, it is possible to easily invoke the same workflow as the workflow with which the job was executed, and also to redo the setting with respect to all the setting items included in the workflow.

Further, the image forming apparatus includes the display input device (for example, operation panel 1) according to the present invention. With this configuration, it is possible to provide an image forming apparatus in which, at the time of the re-invocation of the workflow, there is no need to make a setting for a part for which the same setting as that of the workflow set immediately before may be applied. Therefore, it is possible to provide an image forming apparatus provided with a less complicated, user-friendly user interface (display input device).

(Second Embodiment)

Figure 14:
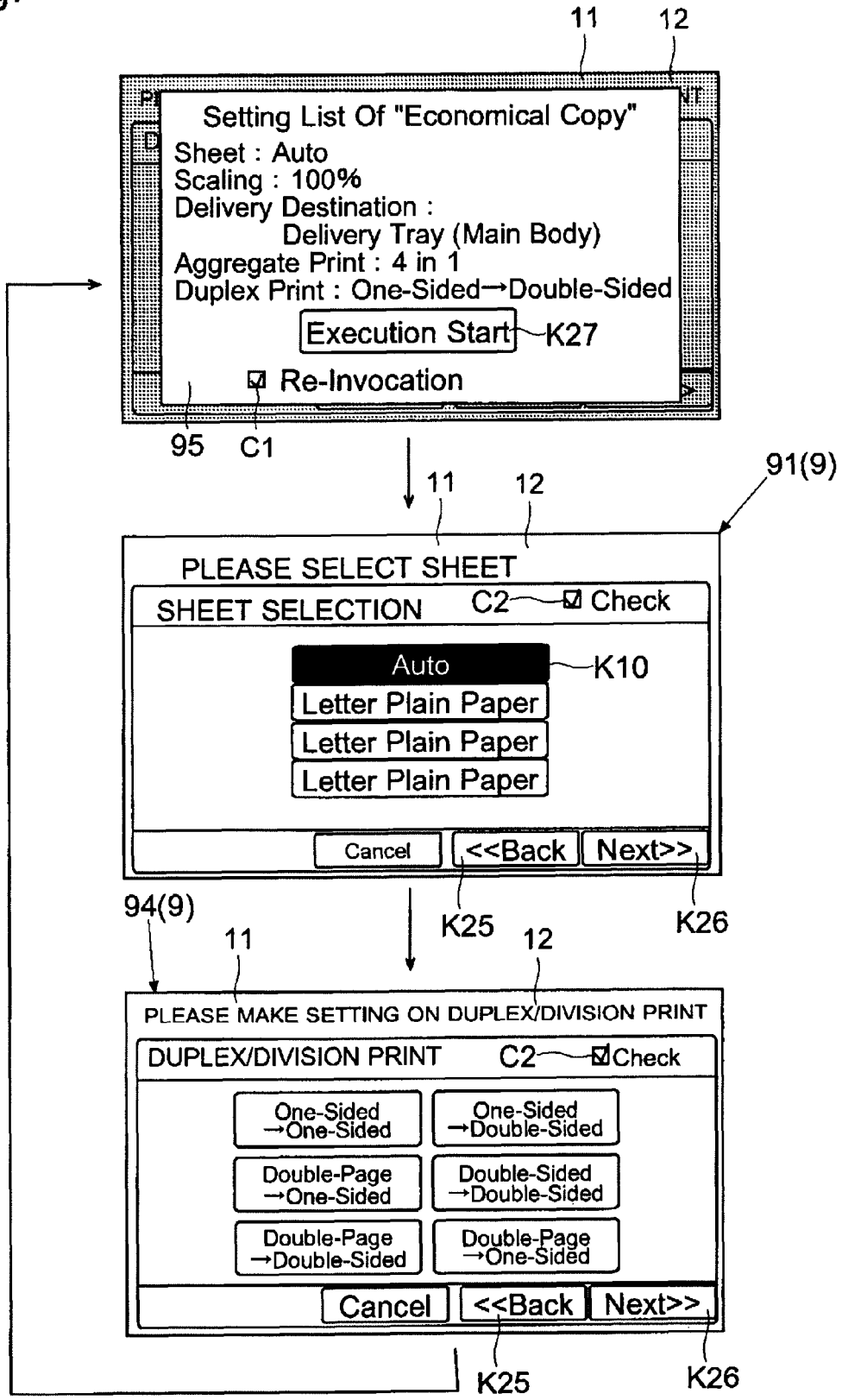
FIG. 14 is an explanatory diagram illustrating an example of the display order used when the re-invocation of the workflow is performed in the wizard format in the multifunction peripheral.

Next, referring to FIG. 14, description is given of an example of display control performed when a workflow is re-invoked in the wizard format according to a second embodiment of the present invention. FIG. 14 is an explanatory diagram illustrating an example of the display order used when a workflow is re-invoked in the wizard format in a multifunction peripheral 100 according to the second embodiment of the present invention.

In the first embodiment, there has been given an example in which, when a workflow is re-invoked, the designated setting screen 9 (setting screen 9 having the marked designation box C2) is displayed again, and after that, the respective setting screens 9 are displayed according to the display order of the workflow. The second embodiment is different from the first embodiment in that, when the re-invocation box C 1 is pressed to re-invoke a workflow, only the designated setting screen 9 (setting screen 9 having the marked designation box C2) is displayed. Note that, other points may be similar to those of the first embodiment, and common parts are regarded as having already been described unless description thereof is particularly necessary. Hence, illustration and description thereof are herein omitted.

Basically, the flow of the display control performed when a workflow is re-invoked by pressing the re-invocation box C1 and executing the job may be the same as the display control described with reference to FIG. 12 in the first embodiment. However, in Step #20 of FIG. 12, according to this embodiment, the display control portion 10 causes the liquid crystal display portion 11 to display only the setting screen 9 having the marked designation box C2.

For example, in a case where only one setting screen 9 has the marked designation box C2 among the setting screens 9 for the setting items included in the workflow, the display control portion 10 causes the liquid crystal display portion 11 to display only the designated one setting screen 9 in the re-invoked workflow. Then, when the "next" key K26 is pressed on the designated setting screen 9, the setting confirmation list 95 is displayed again.

Referring to FIG. 14, more specific description is given. For example, referring to FIG. 14, description is given of a case where the workflow of "economical copy" of FIG. 9 is invoked, and the setting screen 91 for the setting item of sheet selection and the setting screen 94 for duplex print have the marked designation box C2. When the workflow is re-invoked by pressing the re-invocation box C1 and executing the job, as illustrated in FIG. 14, after the setting confirmation list 95 is displayed, the display control portion 10 causes the liquid crystal display portion 11 to display the setting screen 91.

Then, when the "next" key K26 is pressed, the display control portion 10 causes the liquid crystal display portion 11 to display the setting screen 94. Further, when the "next" key K26 is pressed, the display control portion 10 causes the liquid crystal display portion 11 to display the setting confirmation list 95. The display order is from the setting confirmation list 95 to the setting screen 91 for sheet selection to the setting screen 94 for duplex print to the setting confirmation list 95. The following point is the same as in the first embodiment. That is, as for the setting screen 9 for the setting item which is not to be displayed, it is assumed that the same setting as that of the previously-executed workflow has been made (the setting content is stored in, for example, the memory 18).

In this manner, according to the second embodiment, when a program is re-invoked, the control portion (display control portion 10) causes the display portion (liquid crystal display portion 11) to display only the setting screen 9 for which the designation input (the depression of the designation box C2, marking) has been made. With this configuration, it is possible to redo or check the setting only for the setting screen 9 for which the designation input has been made among the setting screens 9 included in the program. Therefore, when the same program is re-invoked, the setting screen 9 that the user desires to be displayed is displayed, and hence it is possible to eliminate or alleviate the complicatedness of the resetting.

(Third Embodiment: Redoing Setting in Wizard Format)

Figure 15:
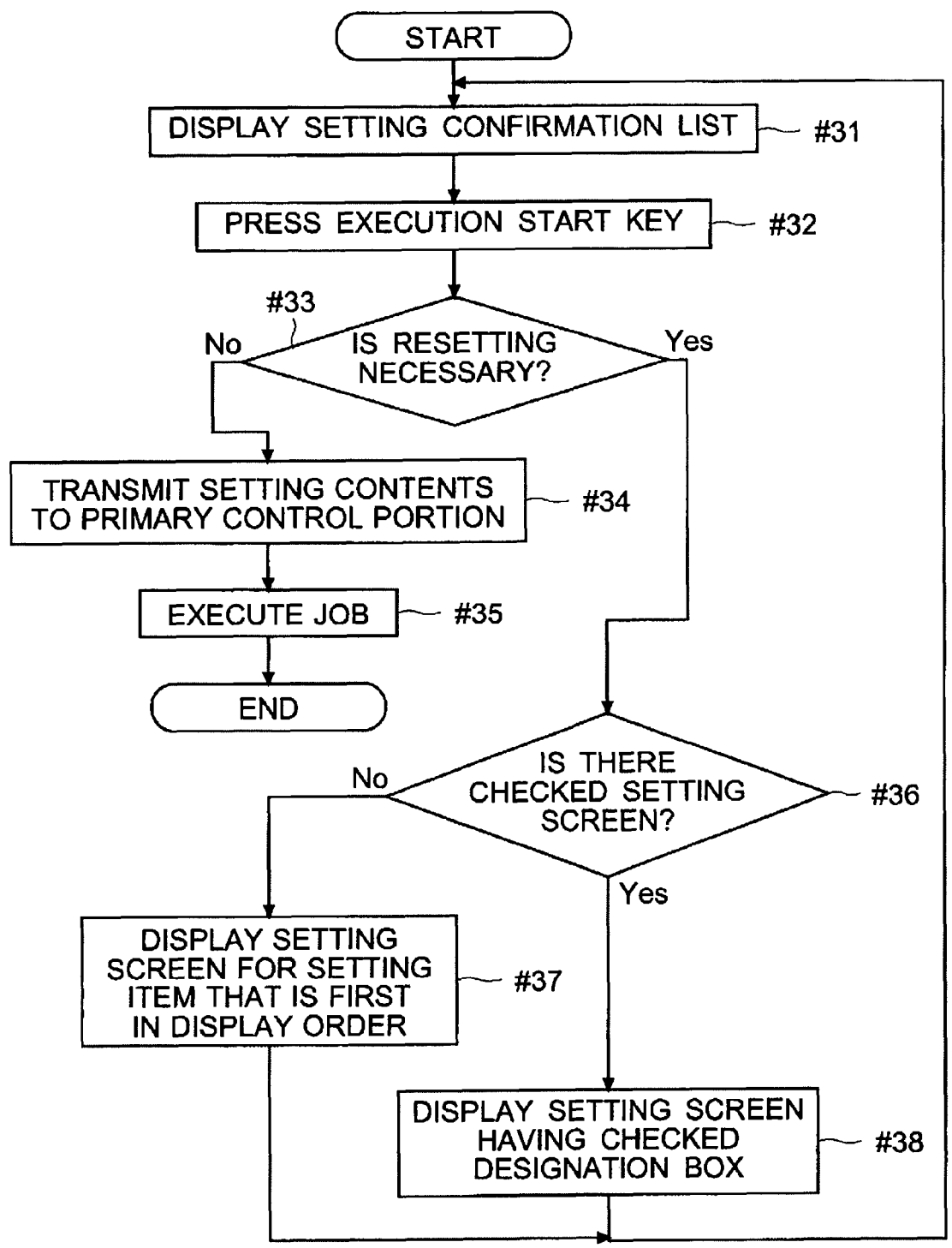
FIG. 15 is a flow chart illustrating an example of the display control performed when setting of a workflow is redone in the wizard format in a multifunction peripheral.
Figure 16:
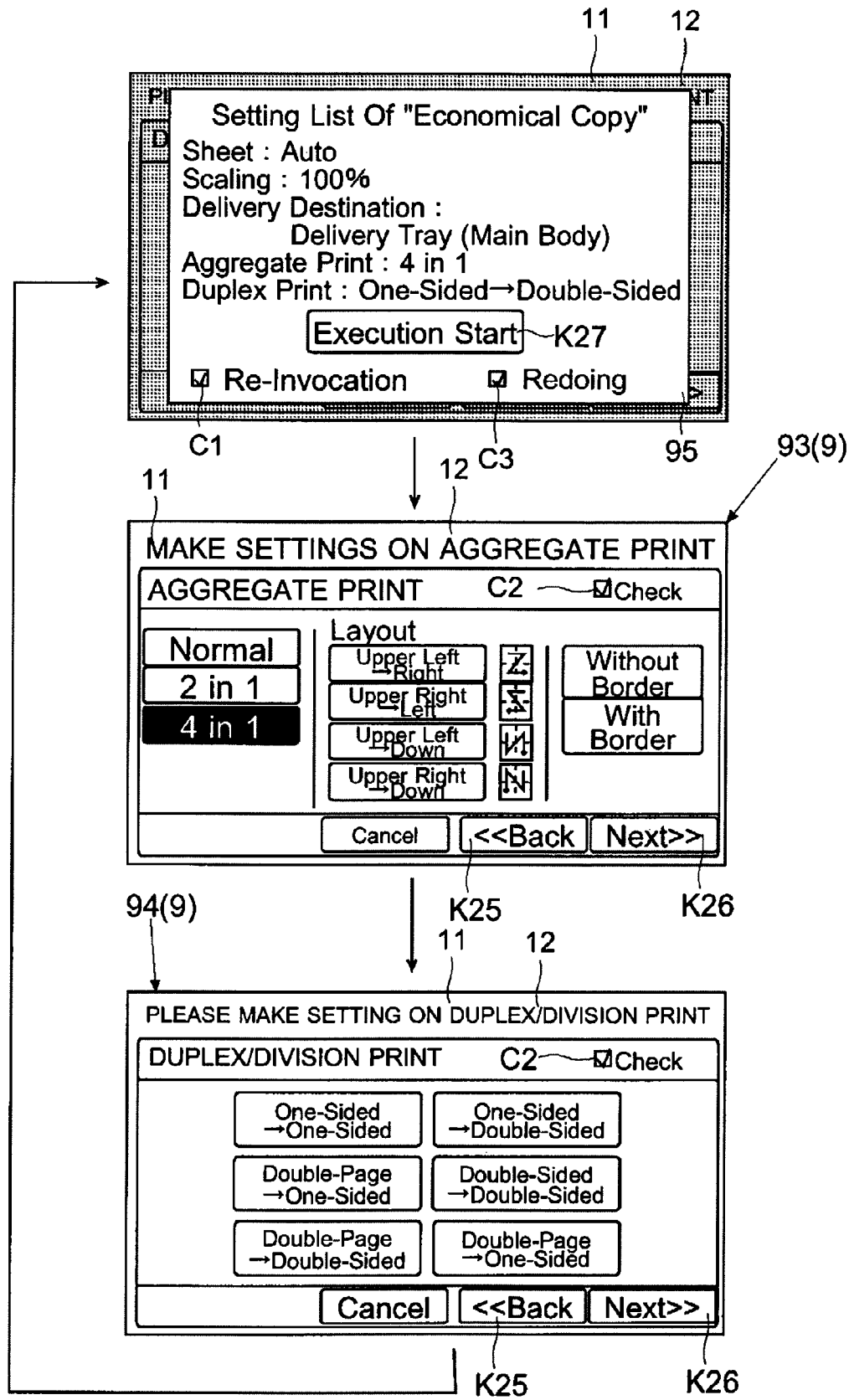
FIG. 16 is an explanatory diagram illustrating an example of the display order used when the setting of the workflow is redone in the wizard format in the multifunction peripheral.

Next, referring to FIGS. 15 and 16, description is given of an example of display control performed when a workflow is invoked in the wizard format and the setting is redone. FIG. 15 is a flow chart illustrating an example of the display control performed when the setting of the workflow is redone in the wizard format in a multifunction peripheral 100 according to a third embodiment of the present invention. FIG. 16 is an explanatory diagram illustrating an example of the display order used when the setting of the workflow is redone in the wizard format in the multifunction peripheral 100 according to the third embodiment of the present invention.

The operation panel 1 and the multifunction peripheral 100 of this embodiment may have the same configurations as in the first embodiment and the second embodiment, and substantially the same applies to the displaying as well. That is, the display control portion 10 causes the liquid crystal display portion 11 to display the re-invocation box C1, the execution start key K27, and the designation box C2. Thus, common parts are regarded as having already been described, and illustration and description thereof are herein omitted.

After all settings are completed along the workflow, there is a case where, before the job is executed, the setting value of a certain setting item included in the workflow is desired to be changed (set again) (for example, in the aggregate print, "2-in-1" is changed to "4-in-1"). In this case, if the user can immediately display the setting screen 9 for the setting item of which he/she desires to change the setting value, the inconvenience felt at the time of redoing the setting of the workflow can be eliminated, resulting in improved usability of the operation panel 1.

In view of the above, by utilizing the designation box C2 displayed by the liquid crystal display portion 11, the redoing of the setting is made easier. In this embodiment, as illustrated in FIG. 16, in addition to the re-invocation box C1, the setting confirmation list 95 is provided with a redoing box C3. When the execution start key K27 is pressed in a state in which the redoing box C3 is marked, the display control portion 10 determines that an input for redoing the setting has been made.

For example, the user marks in advance the designation box C2 of the setting screen 9 for the setting item for which he/she desires to check to redo the setting. For example, it is assumed that the designation box C2 of the setting screen 93 of "aggregate print" is in a marked state. Further, when the user desires to redo the setting of the setting item for which the designation box C2 has been marked, the user marks the redoing box C3, and then presses the execution start key K27. With this, the display control portion 10 takes a shortcut to cause the setting screen 93 of "aggregate print" having the marked designation box C2 to be displayed without displaying the setting screens 91 to 94. Note that, on this occasion, a job is not executed.

Next, referring to FIG. 15, description is given of a flow of the above-mentioned display control performed when the setting of a workflow is redone. First, at the start of FIG. 15, all the settings have already been made for the workflow.

First, the display control portion 10 displays the setting confirmation list 95 (Step #31). Subsequently, the display control portion 10 recognizes that the execution start key K27 has been pressed on the liquid crystal display portion 11 based on an output from the touch panel portion 12 (Step #32). Note that, if necessary, the user presses the redoing box C3 between Step #31 and Step #32.

Subsequently, the display control portion 10 checks whether or not the redoing box C3 is marked, that is, whether or not the setting of the workflow needs to be redone (whether or not resetting is necessary) (Step #33). When the redoing box C3 is not marked, and thus the input is not for redoing the setting (No in Step #33), the display control portion 10 transmits the setting contents determined in the workflow to the primary control portion 8 (Step #34). Then, the primary control portion 8 causes a job such as copying adapted to the setting contents to be executed (from Step #35 to end), and this control is ended. Note that, when the re-invocation box C1 is marked, the same workflow is invoked.

On the other hand, when the setting is to be redone (Yes in Step #33), the display control portion 10 checks whether or not there is a setting screen 9 having the marked designation box C2 (Step #36). When there is no setting screen 9 having the marked designation box C2 (No in Step #36), the display control portion 10 causes the liquid crystal display portion 11 to display the setting screen 9 for the setting item that is first in the display order among the setting items included in the workflow (Step #37).

On the other hand, when there is a setting screen 9 having the marked designation box C2 (Yes in Step #36), the display control portion 10 causes the liquid crystal display portion 11 to display the setting screen 9 having the marked designation box C2 (Step #38). Note that, when a plurality of setting screens 9 have the marked designation box C2 in the workflow, the display control portion 10 causes the liquid crystal display portion 11 to display the setting screen 9 positioned first in the display order among those setting screens 9.

According to this embodiment, when an input for redoing the setting has been made, the display portion (liquid crystal display portion 11) starts with displaying, and displays all setting screens that are subsequent in the display order to, the setting screen 9 for which the designation input has been made (similarly to the second embodiment, only the setting screen 9 for which the designation input has been made may be displayed). Then, after Step #37 or Step #38, the "next" key K26 is pressed once or a plurality of times, and, as a result, the setting confirmation list 95 is displayed (to Step #31).

For example, referring to FIG. 16, description is given of the case where the workflow of "economical copy" of FIG. 9 is invoked, and there is a checkmark on the setting screen 93 for the setting item of aggregate print. When the input for redoing the setting has been made (the redoing box C3 is marked), and the execution start key K27 is pressed, as illustrated in FIG. 16, the display control portion 10 causes the liquid crystal display portion 11 to display the setting screen 93 for aggregate print. Then, when the "next" key K26 is pressed, the display control portion 10 causes the liquid crystal display portion 11 to display the setting screen 94. Further, when the "next" key K26 is pressed, the display control portion 10 causes the liquid crystal display portion 11 to display the setting confirmation list 95.

When the input for redoing the setting has been made, the display control portion 10 performs loop display between the setting screen 9 for the designated setting item and the setting confirmation list 95, thereby preventing the setting screen 9 for the setting item that precedes the designated setting item from being displayed.

In this manner, in the display input device (for example, operation panel 1) of this embodiment, the input portion (touch panel portion 12 or the like) receives a redoing input (marking on the redoing box C3) for redoing setting of the program currently invoked; and when the redoing input is made, the control portion (display control portion 10) causes the display portion (liquid crystal display portion 11) to start with displaying, and display the setting screens 9 subsequent in the display order to, the setting screen 9 for which the designation input (the depression of the designation box C2, marking) has been made (corresponding to Step #38). With this configuration, by making the designation input with respect to the setting screen 9 that is likely to need the resetting (redoing of setting), the user can prevent the setting screen 9 that precedes, in the display order of the program, the setting screen 9 for which the designation input has been made from being displayed. In other words, at the time of redoing the setting, it is possible to take a shortcut to the setting screen 9 for which the designation input has been made without displaying unnecessary setting items. Therefore, at the time of redoing the setting, not the entire series of steps of the flow is repeated, and it is possible to skip to the intended setting screen 9 quickly, and also to eliminate or alleviate the complicatedness of the setting. In addition, the usability of the display input device (for example, operation panel 1) is improved.

Further, when the redoing input is made in the state in which there is no setting screen 9 for which the designation input has been made, the control portion (display control portion 10) causes the display portion (liquid crystal display portion 11) to display the setting screen 9 from the setting item that is first in the display order among the setting items included in the workflow (corresponding to Step #37 of FIG. 15). With this configuration, it is also possible to redo the setting with respect to all the setting items included in the workflow.

Next, another embodiment is described. The third embodiment described above is directed to the displaying at the time of redoing the setting when a workflow as a program is invoked. However, the present invention is also applicable to a case of normal setting operation in which a workflow is not invoked.

For example, in the normal setting operation, the storage portion such as the storage device 82 or the operation panel 1 stores the selected setting items (setting items for which the setting screens 9 have been displayed) and the order thereof. Then, similarly to the case of invoking a workflow, the liquid crystal display portion 11 displays the designation box C2 on each setting screen 9, and the display control portion 10 recognizes the marking of the designation box C2 (the depression of the designation box C2) via the touch panel portion 12.

Then, the user completes making his/her desired setting, and then presses, for example, a predetermined key (for example, start key 14) on the operation panel 1 (corresponding to the redoing input). With this, the display control portion 10 causes the setting screen 9 for the setting item having the marked designation box C2 to be displayed. After that, according to the stored display order, the display control portion 10 may cause the liquid crystal display portion 11 to perform the displaying from the setting screen 9 having the marked designation box C2 until the setting screen 9 for which the user has pressed the start key 14 (the last setting screen 9 in the display order). Alternatively, according to the stored display order, the display control portion 10 may sequentially display only the setting screens 9 for the setting items having the marked designation box C2.

Specifically, in the display input device (for example, operation panel 1) of this embodiment, in a state in which the program is not invoked: the storage portion (memory 18 and storage device 82) stores the displayed setting screen 9 and the display order; the input portion (touch panel portion 12 or the like) receives the designation input (the depression of the designation box C2, marking) for designating the setting screen 9 displayed by the selection of the setting item, and also receives the redoing input for performing resetting by displaying the setting screen 9 displayed before; and when the redoing input is made, the display portion (liquid crystal display portion 11) starts with displaying, and displays the setting screens 9 subsequent in the display order to, the setting screen 9 for which the designation input has been made, in the display order stored in the storage portion. With this configuration, even in the case of a setting input that does not use a program, it is possible to redo the setting without selecting again a setting item for which the setting is to be redone.

The embodiments of the present invention have been described, but the scope of the present invention is not limited thereto. The present invention may be implemented by making various modifications thereto without departing from the gist of the present invention.

What is claimed is:

1. A display input device, comprising:
    a display portion for displaying a plurality of kinds of executable functions as setting items, and displaying setting screens for the setting items;
    a storage portion for storing:
        a workflow, which is a combination of setting items selected and registered in advance from among a plurality of the setting items, and is invoked to cause the display portion to sequentially display, in a wizard format, the setting screen for each of the setting items selected and registered in advance; and
        setting contents of the invoked workflow;
    an input portion for receiving at least a selection of the setting item and an input made with respect to the setting screen, and further receiving:
        a designation input for designating the setting screen to be displayed by the workflow;
        a job execution start input for starting a job based on the setting contents of the invoked workflow; and
        a re-invocation input for re-invoking, for setting of a next job, the same workflow as the workflow for which the job execution start input was made; and
    a control portion configured to:
        control displaying of the display portion;
        recognize the setting contents set by using the input portion;
        cause, after the re-invocation input is made, and when automatically re-invoking in a wizard format the same workflow as the workflow of a job executed as a result of the job execution start input, the display portion to start with displaying, in display order of the workflow, the setting screen for which the designation input has been made; and
        recognize, as for a setting screen that is not to be displayed, that the same setting as in the workflow executed immediately before is made.

2. A display input device according to claim 1, wherein, when the workflow is re-invoked, the control portion causes the display portion to display all the setting screens starting with, in the display order, the setting screen for which the designation input has been made.

3. A display input device according to claim 1, wherein, when the workflow is re-invoked, the control portion causes the display portion to display only the setting screen for which the designation input has been made.

4. A display input device according to claim 1, wherein, when the workflow is re-invoked by means of the re-invocation input and the job execution start input in a state in which there is no setting screen for which the designation input has been made, the control portion causes the display portion to display the setting screens from the setting item that is first in the display order among the setting items included in a workflow.

5. A display input device according to claim 1, wherein:
    the input portion receives a redoing input for redoing setting of the workflow currently invoked; and
    when the redoing input is made, the control portion causes the display portion to display the setting screen starting with, in the display order, the setting screen for which the designation input has been made.

6. A display input device according to claim 5, wherein, when the redoing input is made in a state in which there is no setting screen for which the designation input has been made, the control portion causes the display portion to display the setting screen from the setting item that is first in the display order among the setting items included in a workflow.

7. A display input device according to claim 1, wherein, in a state in which the workflow is not invoked:
    the storage portion stores the displayed setting screen and the display order;
    the input portion receives the designation input for designating the setting screen displayed by the selection of the setting item, and also receives a redoing input for performing resetting by displaying the setting screen displayed before; and
    when the redoing input is made, the display portion displays the setting screen starting with, in the display order, the setting screen for which the designation input has been made, in the display order stored in the storage portion.

8. An image forming apparatus, comprising the display input device according to claim 1.

9. A display method for a display input device, comprising:
    displaying a plurality of kinds of executable functions as setting items;
    displaying setting screens for the setting items;
    storing:
        a workflow, which is a combination of setting items selected and registered in advance from among a plurality of the setting items, and is invoked to cause a display portion to sequentially display, in a wizard format, the setting screen for each of the setting items selected and registered in advance; and
        setting contents of the invoked workflow;
    receiving a selection of the setting item and an input made with respect to the setting screen;
    receiving a designation input for designating the setting screen to be displayed by the workflow;
    receiving a job execution start input for starting a job based on the setting contents of the invoked workflow;

receiving a re-invocation input for re-invoking, for setting of a next job, the same workflow as the workflow for which the job execution start input was made;

displaying, when the workflow is re-invoked by means of the re-invocation input and the job execution start input, as the starting setting screen in display order of the workflow, the setting screen for which the designation input has been made; and assuming, as for a setting screen that is not to be displayed, that the same setting as in the workflow executed immediately before is made.

10. A display method for a display input device according to claim 9, further comprising displaying, when the workflow is re-invoked, all the setting screens starting with, in the display order, the setting screen for which the designation input has been made.

11. A display method for a display input device according to claim 9, further comprising displaying, when the workflow is re-invoked, only the setting screen for which the designation input has been made.

12. A display method for a display input device according to claim 9, further comprising displaying, when the workflow is re-invoked by means of the re-invocation input and the job execution start input in a state in which there is no setting screen for which the designation input has been made, the setting screens from the setting item that is first in the display order among the setting items included in a workflow.

13. A display method for a display input device according to claim 9, further comprising:

receiving a redoing input for redoing setting of the workflow currently invoked; and displaying, when the redoing input is made, the setting screen starting with, in the display order, the setting screen for which the designation input has been made.

14. A display method for a display input device according to claim 13, further comprising displaying, when the redoing input is made in a state in which there is no setting screen for which the designation input has been made, the setting screen from the setting item that is first in the display order among the setting items included in a workflow.

15. A display method for a display input device according to claim 9, further comprising, in a state in which the workflow is not invoked:

storing the displayed setting screen and the display order;

receiving the designation input for designating the setting screen displayed by the selection of the setting item;

receiving a redoing input for performing resetting by displaying the setting screen displayed before; and displaying, when the redoing input is made, the setting screen starting with, in the display order, the setting screen for which the designation input has been made, in the stored display order.

16. A display input device according to claim 1, wherein the control portion is configured, when automatically re-invoking the same workflow as the workflow of a job executed as a result of the job execution start input, to cause the display portion to display, in the display order of the workflow, setting screens subsequent to the setting screen on which a designation input was made during execution of the job executed as a result of the job execution start input.

17. A display method for a display input device according to claim 9, further comprising, when automatically re-invoking the same workflow as the workflow of a job executed as a result of the job execution start input, displaying on the display portion, in the display order of the workflow, setting screens subsequent to the setting screen on which a designation input was made during execution of the job executed as a result of the job execution start input.

18. A display input device, comprising:

a display portion for displaying setting screens;

a storage portion for storing:

as a workflow, a combination of predetermined setting items selected in advance from a plurality of available setting items, which when invoked will cause the display portion to sequentially display, in a wizard format, an individual setting screen for each predetermined setting item; and setting contents of the workflow when invoked;

an input portion for selecting the predetermined setting items and receiving a setting input with respect to a setting screen, the input portion further configured to receive:

a designation input for designating a setting screen in the workflow as a start screen in a re-invoked occurrence of the workflow;

a job execution start input for starting a job based on the setting contents of the invoked workflow; and a re-invocation input for re-invoking, in preparation for a subsequent job, the same workflow that receives the job execution start input to start a present job; and a control portion configured to:

recognize setting contents stored in the storage portion;

control the display portion—after the re-invocation input is made, and when re-invoking in preparation for a subsequent job, in a wizard format, the same workflow that receives the job execution start input to start the present job—to skip to and display, as a first setting screen in the display order of the workflow, a setting screen that was designated as a start screen by a designation input; and apply, for any setting screen skipped when re-invoking the same workflow, the same setting as applied in the previous invocation of the same workflow, as recognized from the setting contents.

19. A display input device according to claim 18, wherein the control portion is configured, when re-invoking in preparation for a subsequent job the same workflow that receives the job execution start input to start the present job, to cause the display portion to display, in the display order of the workflow, setting screens subsequent to the setting screen that was designated as a start screen by a designation input.

* * * * *